US008396012B2

(12) United States Patent
Daraiseh et al.

(10) Patent No.: US 8,396,012 B2
(45) Date of Patent: Mar. 12, 2013

(54) ADAPTIVE WIRELESS PROCESS CONTROL SYSTEM AND METHOD

(75) Inventors: Abdelghani Daraiseh, Dhahran (SA); Mohamed Adnan Landolsi, Dhahran (SA)

(73) Assignees: Saudi Arabian Oil Company, Dhahran (SA); King Fahd University Of Petroleum and Minerals, Dhahran (SA)

( * ) Notice: Subject to any disclaimer, the term of this patent is extended or adjusted under 35 U.S.C. 154(b) by 236 days.

(21) Appl. No.: 12/990,588

(22) PCT Filed: May 1, 2009

(86) PCT No.: PCT/US2009/042517
§ 371 (c)(1),
(2), (4) Date: Nov. 1, 2010

(87) PCT Pub. No.: WO2009/135122
PCT Pub. Date: Nov. 5, 2009

(65) Prior Publication Data
US 2011/0164518 A1 Jul. 7, 2011

Related U.S. Application Data

(60) Provisional application No. 61/049,682, filed on May 1, 2008.

(51) Int. Cl.
H04L 12/28 (2006.01)
(52) U.S. Cl. ...................................................... 370/255
(58) Field of Classification Search .................. None
See application file for complete search history.

(56) References Cited

U.S. PATENT DOCUMENTS 6,061,736 A * 5/2000 Rochberger et al. .......... 709/241
6,400,681 B1 * 6/2002 Bertin et al. ................... 370/218
6,751,746 B1 6/2004 Jain et al.
6,895,547 B2 5/2005 Eleftheriou
6,961,310 B2 11/2005 Cain
2003/0233474 A1 12/2003 Yamamoto
2004/0114569 A1 6/2004 Naden
2004/0156316 A1 8/2004 Mukherjee
2005/0117526 A1 * 6/2005 Melnik .......................... 370/254
2006/0182034 A1 * 8/2006 Klinker et al. ................ 370/238
2008/0037525 A1 2/2008 Karaoguz
2008/0126665 A1 5/2008 Burr
2008/0192627 A1 * 8/2008 Lichtwald ..................... 370/228
2008/0279183 A1 11/2008 Wiley
2009/0016331 A1 * 1/2009 Shah et al. .................... 370/356

FOREIGN PATENT DOCUMENTS

CN 1679358 A 10/2005

OTHER PUBLICATIONS

International Search Report and Written Opinion of corresponding PCT Application, PCT/US2009/042517, mailed Nov. 11, 2010.
W. Kastner et al., "Communication Systems for Building Automation and Control," Proceedings of the IEEE (Jun. 1, 2005). International Search Report and Written Opinion of related PCT Application, PCT/US2010/055236, mailed Dec. 29, 2010.
State Intellectual Property Office of the People's Republic of China, Application No. 2009080122059.5, Search Report, Dec. 5, 2012, and English language translation (4 pages).

* cited by examiner

Primary Examiner — Raj Jain
(74) Attorney, Agent, or Firm — Abelman, Frayne & Schwab

(57) ABSTRACT

The present invention relates to a method and system that provides hierarchical adaptability components to a wireless process control and/or automation network that increase system efficiency and reliability. The invention comprehends an intelligent and efficient process to design and operate a wireless process control and/or automation network while utilizing minimum system resources. In certain embodiments, path requirements are specified per usage class whereby minimum utilization of bandwidth, paths and hardware is allocated, while meeting plant environment requirements for services such as closed-loop regulatory and supervisory control, open-loop control, alerting, logging and remote monitoring.

62 Claims, 16 Drawing Sheets

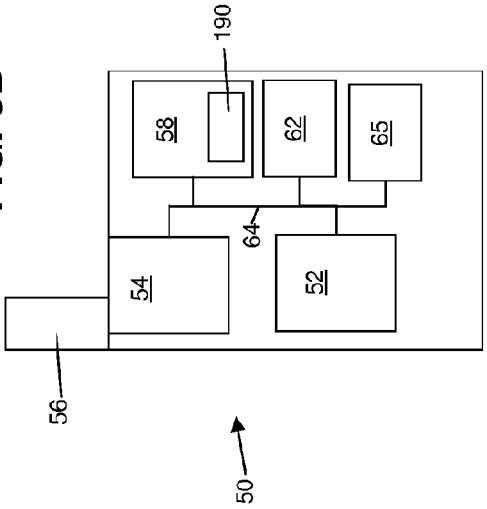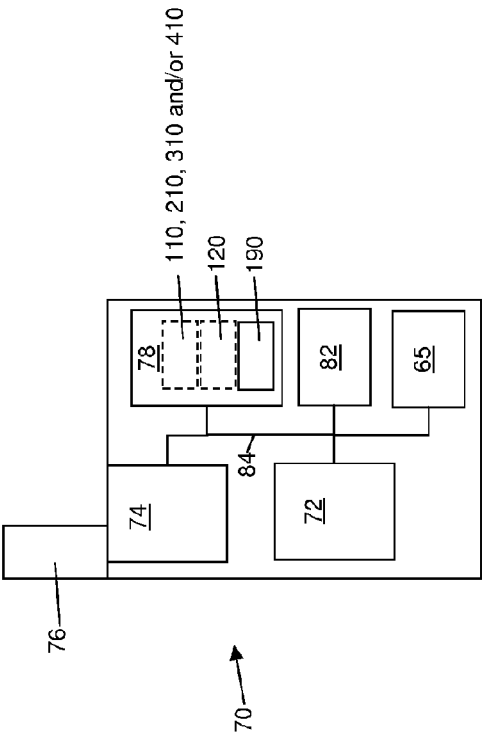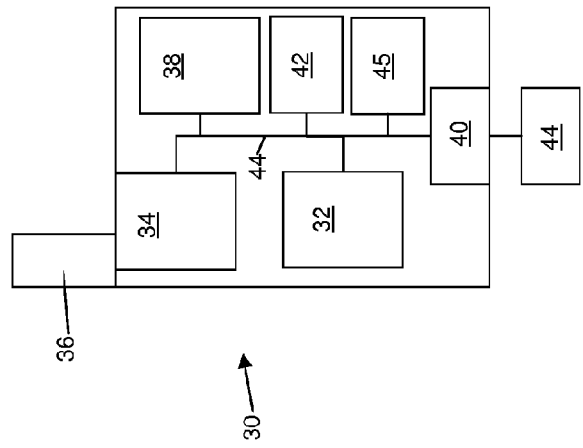

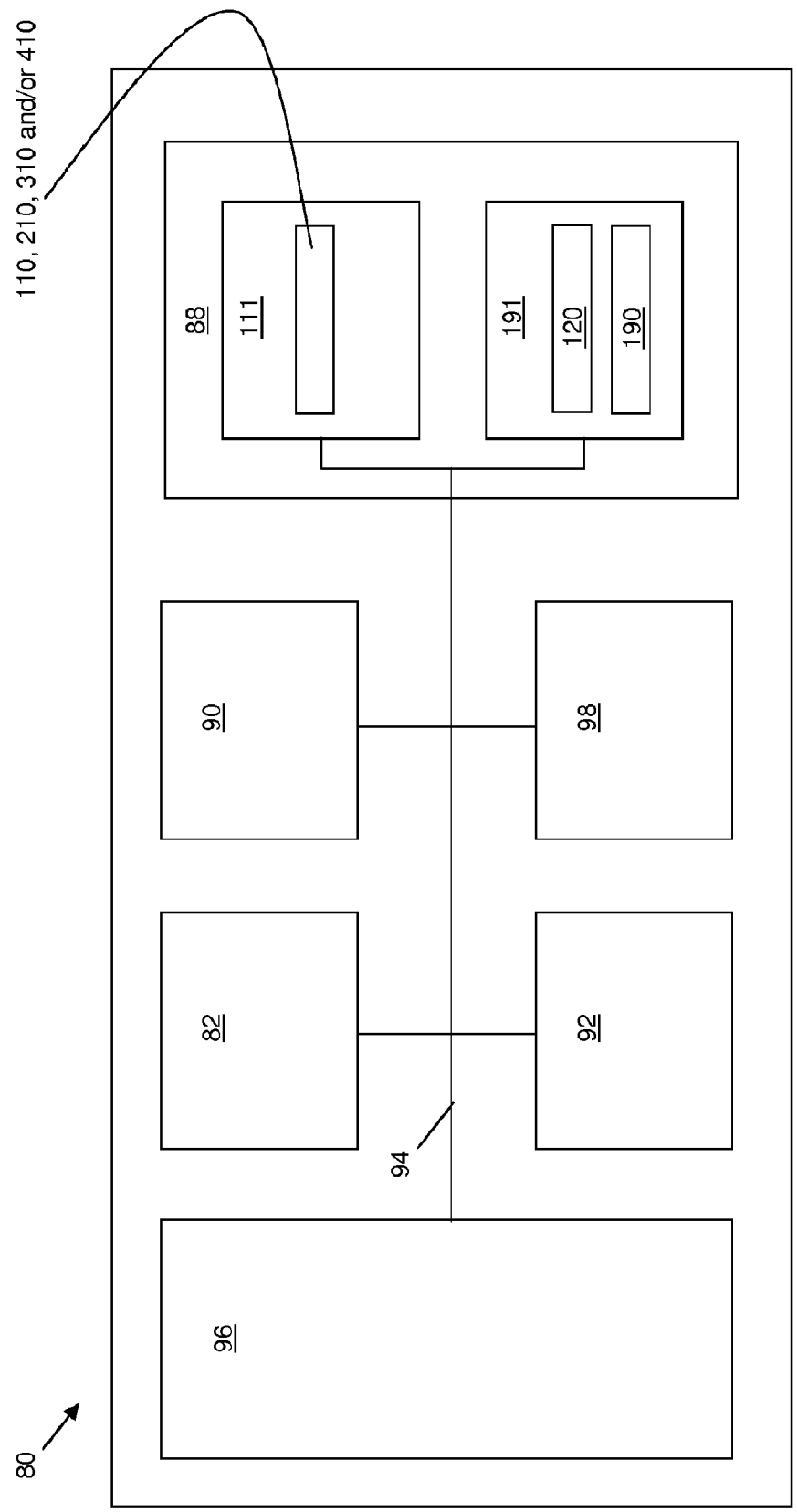

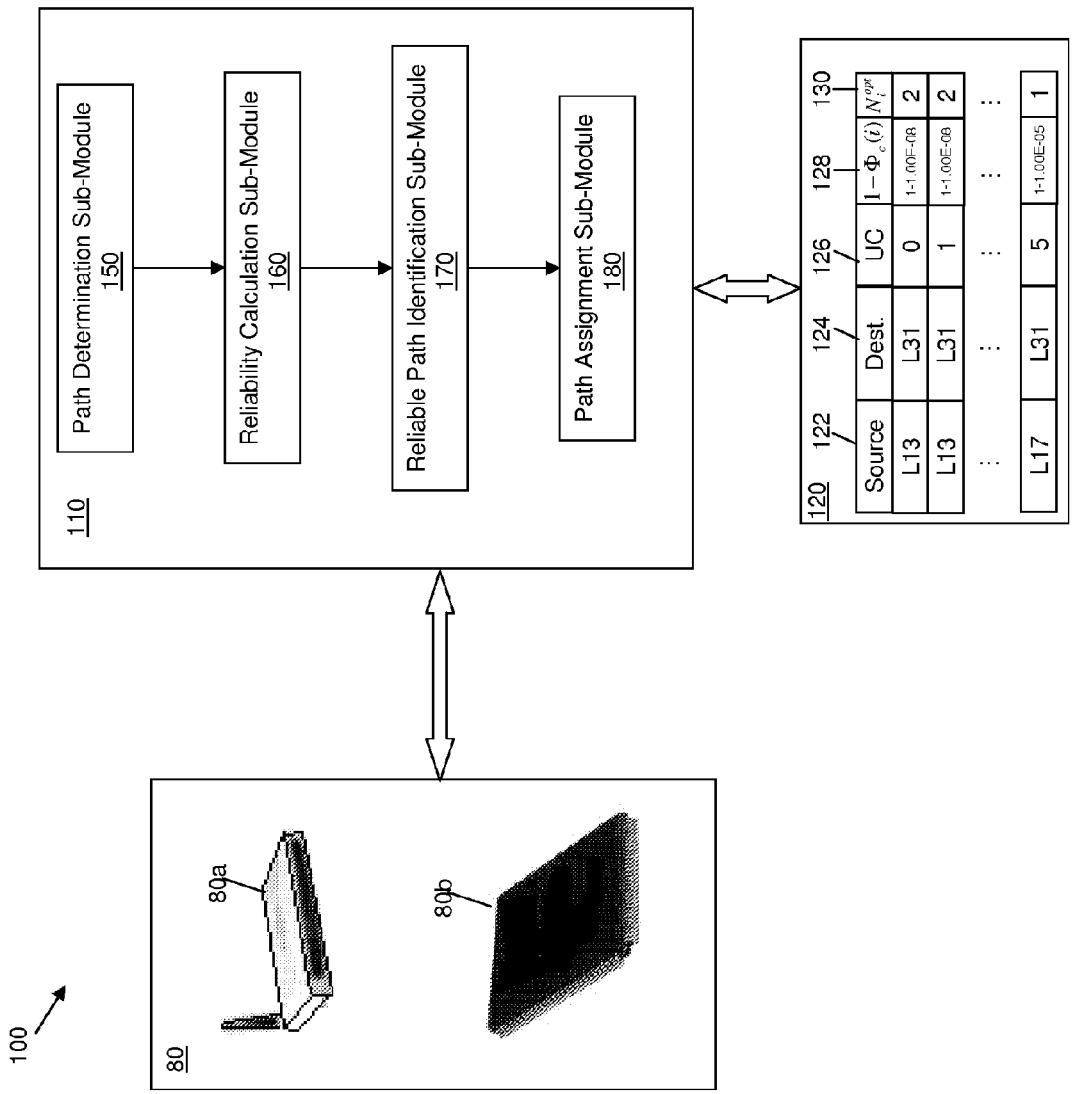

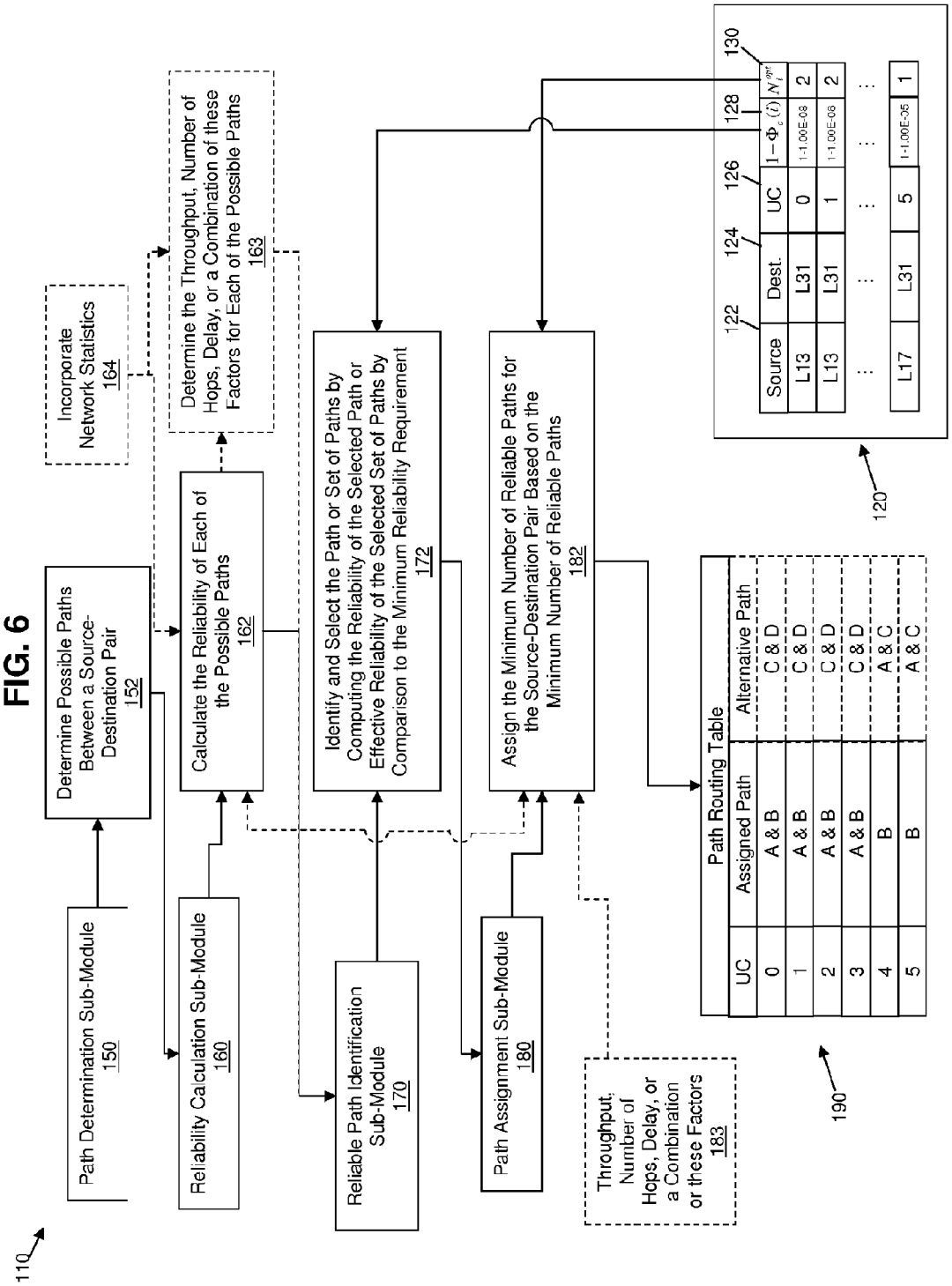

ADAPTIVE WIRELESS PROCESS CONTROL SYSTEM AND METHOD

RELATED APPLICATIONS

The present application is a United States national phase application under 35 USC §371 of PCT/US09/42517 filed on May 1, 2009, which claims priority to U.S. Provisional Patent Application 61/049,682 filed on May 1, 2008, both of which are incorporated by reference in their entireties in the present application.

BACKGROUND OF THE INVENTION

1. Field of the Invention

The present invention relates to wireless process control systems and methods, and more particularly to such systems and methods that include hierarchical adaptability to operate a wireless process control and/or automation network while utilizing minimum system resources.

2. Description of Related Art

The International Society of Automation (ISA) has established a Wireless Systems for Automation Standards Committee (ISA-SP100) tasked with defining wireless connectivity standards. The SP100 wireless standard for process automation systems is applicable to industries such as oil and gas, petrochemical, water/wastewater treatment and manufacturing. The SP100 standard is intended for use in the 2.4 GHz band, with data transfer at speeds up to 250 kilobytes per second within a 300 meter range. SP100 devices have relatively lower data rates and energy requirements than comparable wireless Local Area Networks (LAN), as they are intended to be low cost devices.

The SP100 protocol specifies different types of communications, categorized as "usage classes," and increasing in criticality based upon decreasing numerical designation. "Class 0" communications include those categorized as critical for safety applications such as emergency shut-down systems, and are deemed always critical; "Class 1" is for closed-loop regulatory control, often deemed critical; "Class 2" is for closed-loop supervisory control, usually non-critical; "Class 3" is for open-loop control; "Class 4" is for alerting or annunciation; and "Class 5" is for data logging. Certain events, such as alarms, can have different classifications of service depending on the message type.

In general, devices in an SP100 system can be divided into three categories, commonly referred to as "tiers." Tier 1 includes end devices, such as meters, remote terminal units, valves, sensors, tank level measuring devices, and the like, each of which is connected to a wireless end device. Wireless end devices (WEDs) can transmit to and receive from all other devices, but cannot route to other devices. Tier 2 includes wireless intermediate devices (WIDs), which transmit to and receive from all other devices, and route to other devices. Tier 3 includes wireless gateway devices (WGDs), which transmit to, receive from, and route between other devices, and also conduct high level applications including protocol translation and assignment of paths for source-destination pairs. As used herein, the components WEDs, WIDs and WGDs are also referred to as "nodes."

FIG. 1A is a schematic diagram of a known exemplary architecture for an SP100 Wireless Process Control System of the prior art. Connectivity between WEDs L17 and L13 and WGDs L35 and L31, respectively, are illustrated, although as will be understood by one of ordinary skill in the art, connectivity is typically provided between all WEDs and a WGD at the Central Control Room (CCR). For example, L17-L293-L292-L36-L35 is a path for the source-destination pair L17-L35, and L292-L35 is one of the links within this path.

Devices in an SP100 wireless system are generally connected in the form of a mesh or star-mesh network. Connection between the various devices is performed through radio communications, for instance as specified by a Carrier Sense Multiple Access with Collision Avoidance (CSMA-CA) protocol or the like, and connections are established at a network layer and a Medium Access Control (MAC) layer.

In existing wireless process control and/or automation systems, every frame transmitted from WED to the CCR is treated the same, regardless of its usage class or criticality. The constraints are that the transmitted frames reach the CCR within specified maximum allowable end-to-end time delay and a specified frame error rate (FER). Commonly, all WIDs and WGDs route incoming traffic irrespective of the usage class, and without regard to a frame's status as an original transmission or a retransmission. Multiple paths between WEDs and the CCR are typically specified in a routing table for increased reliability of data frame transmission and receipt. Retransmission of frames occurs and is requested if the received frame is judged to be erroneous or no acknowledgment is received (i.e., timeout occurs).

While a large number of paths provide a certain degree of reliability, this topology increases the bandwidth requirements for the wireless spectrum, battery energy usage, and quantity and/or sophistication level of requisite hardware. In addition, channel contention often occurs due to high channel utilization, increased latency between the WEDs and CCR, and frame blocking. Therefore, diminishing returns result, such that an increase in the number of paths beyond a certain level will not significantly increase the reliability, thereby inefficiently using bandwidth, hardware and battery usage energy requirements.

Another commonly employed wireless process control and/or automation network has been recently developed as a derivative of the Highway Addressable Remote Transmitter (HART) Communication Foundation protocols, referred to generally as the HART® protocol. However, the wireless implementation of the HART® protocol has suffered some of the same drawbacks as the SP100 protocol, namely, battery usage and channel contention.

Therefore, a need exists for reliable and adaptable methods and systems to operate a wireless process control and/or automation network while utilizing minimum system resources.

SUMMARY OF THE INVENTION

The present invention relates to a method and system that provides hierarchical adaptability components to a wireless process control and/or automation network that increase system efficiency and reliability. The invention comprehends an intelligent and efficient process to design and operate a wireless process control and/or automation network while utilizing minimum system resources. In certain embodiments, path requirements are specified per usage class whereby minimum utilization of bandwidth, paths and hardware is allocated while meeting plant environment requirements for services such as closed-loop regulatory and supervisory control, open-loop control, alerting, logging and remote monitoring.

In wireless systems having a large number of networked devices, efficient spectrum usage and delay minimizations are critical design and planning factors. Wireless process control and/or automation networks, including those operating under the ISA-SP100 protocol and/or the wireless HART® protocol, co-exist with other wireless systems operating in similar bands, e.g., 2.4 MHz, such as wireless LAN (including IEEE 802.11), BLUETOOTH™, ZIGBEE™, and the like. Efficient spectrum utilization in operation of a wireless process control and/or automation network in turn benefits other wireless systems utilizing the same frequency band. Accordingly, the present invention minimizes spectrum utilization by routing only frames and/or packets that meet one or more constraints. Paths are identified that meet the specified constraint(s). During operation, paths are discarded and/or replaced when they longer satisfy the constraint(s).

In addition, wireless process control and/or automation network are commonly deployed in harsh and classified areas, such as hazardous areas referred to as "Class 1, Division 1" and "Class 1, Division 2." In these locations, flammable gas mixtures can be present. Many wireless control and/or automation devices in these environments are commonly battery-operated, mandating periodic battery replacement. Accordingly, reducing battery demand results in higher lifecycle, lower capital and operating costs, and reduced occurrences of worker access to these network devices in areas classified as hazardous.

In one method of operating a wireless process control and/or automation network according to the present invention, steps are carried out to select a minimum number of paths for one or more source-destination pairs. Potential paths between each source-destination pair are initially chosen. The reliabilities of each of the potential paths and/or the effective reliabilities of groups of paths are determined Paths or groups of paths that meet the minimum reliability requirements are identified by comparing the calculated reliabilities and/or effective reliabilities with minimum reliability requirements specified in a set of routing rules. Paths are selected from the identified reliable paths based on a minimum number of paths specified in the set of routing rules and assigned in a routing table. Paths or groups of paths above the specified minimum number of paths that meet the reliability requirements are discarded, i.e., not assigned in the routing table (as opposed to disabling the path), or assigned as alternate paths in the routing table. The paths that are discarded can be assigned in the future, for instance, if one of the previously assigned paths or alternate paths encounters excessive traffic and can no longer meet the requisite constraint(s) including the minimum reliability requirements.

In another method of operating a wireless process control and/or automation network according to the present invention, steps are carried out to select paths based on constraints related to end-to-end delays between a source-destination pair.

In a further method of operating a wireless process control and/or automation network according to the present invention, steps are carried out to select paths based on constraints related to tier delays for links within a given tier. Notably, employing a constraint based on tier delays minimizes the number of links or hops in a given path between a source-destination pair.

In an additional method of operating a wireless process control and/or automation network according to the present invention, steps are carried out to select a minimum number of reliable paths that further meet constraints related to end-to-end delays and/or tier delays.

In still another method of operating a wireless process control and/or automation network according to the present invention, steps are carried out to select a minimum number of reliable paths that further meet constraints related to one or more of end-to-end delays and/or tier delays, maximum throughput per link, and a minimal number of hops.

In one system of the invention for operating a wireless process control and/or automation network, a route optimization module is executed by hardware which can include one or more of the wireless gateway devices, a separate computing device in communication with the wireless network, or a combination thereof. The route optimization module includes a path determination sub-module that determines possible paths between the selected source-destination pair. A reliability calculation sub-module is provided that determines the reliability of each of the possible paths, and/or the effective reliability of one or more groups of paths. The route optimization module also includes a reliable path identification sub-module that identifies reliable paths or groups of paths by comparing the reliability and/or effective reliability with minimum reliability requirements specified in a set of routing rules, and a path assignment sub-module for assigning reliable paths or one or more groups of paths to a routing table based on the a minimum number of paths specified in the set of routing rules. Paths or groups of paths above the specified minimum number of paths that meet the reliability requirements are discarded, i.e., not assigned in the routing table, or assigned as alternate paths in the routing table.

In another system of the invention for operating a wireless process control and/or automation network, an end-to-end delay minimization module is provided, in which paths are selected based on constraints related to end-to-end delays for paths between a source-destination pair.

In a further system of the invention for operating a wireless process control and/or automation network, a tier delay minimization module is provided, in which paths are selected based on constraints related to tier delays for links within a given tier.

In an additional system of the invention for operating a wireless process control and/or automation network, a delay minimization module is provided, in which paths are selected based on constraints related to both end-to-end delays and tier delays.

In still another system of the invention for operating a wireless process control and/or automation network, a module is provided to select a minimum number of reliable paths, and one or more additional or sub-modules modules are to select paths based on further constraints related to end-to-end delays and/or tier delays, maximum throughput per link, a minimal number of hops, or a combination of one or more of end-to-end delays and/or tier delays, maximum throughput per link, and a minimal number of hops.

In certain embodiments, the reliability, e.g., the maximum allowable frame error rate (FER), is specified for one or more of the usage classes, and the assigned minimum number of reliable paths is specified per usage class. Usage classes or groups of usage classes with higher degrees of criticality, e.g., classes 0 and 1 in an SP100 system, have a higher reliability threshold, i.e., lower maximum allowable frame error rates as compared to usage classes of lower criticality. Further, usage classes of lower criticality can have fewer assigned minimum reliable paths.

Further embodiments of the process of the present invention provide that the maximum allowable frame error rate per usage class, the process control wireless traffic distribution, the links' reliability profile, tier delay, or a combination of these factors are used to generate a subset of paths containing a minimum number of paths with associated reliability weight. For source-destination pairs in which the minimum number of paths is not attained based on the above-described routing assignment process or the above-described sub-modules, selective paths are combined, i.e., groups of paths, or additional paths are incorporated, until the end-to-end frame error rate for each usage class is lower than the class's maximum allowable threshold, while applying the criteria of employing a minimum number of intermediate links.

Embodiments of the present invention include additional steps or sub-modules for incorporation within conventional wireless network protocols, including: (1) defining a maximum allowable delay for each tier; (2) including usage class bits to the routing table; (3) considering whether a frame is a retransmit frame; (4) providing an action-type bit to the frame format structure where the received frames for a destination are not actioned until the end of the maximum allowable delay (i.e., the received frame is not actioned until the end of the maximum allowable delay to ensure that all frames arriving from different routes are received and the frames with a high quality indicator are passed to the CCR for action); (5) dropping and/or routing the frame as a function of the usage class; and/or (6) during abnormal channel conditions, sending a control message to WIDs and/or WGDs in a wireless process control and/or automation protocol network to allow routing of frames for a particular pair of source-destination pairs irrespective of the usage class, thereby dynamically increasing the number of available paths. Accordingly, in certain embodiments, the method and system of the present invention minimizes the required number of frames transported over wireless links while meeting reliability and latency requirements.

In an example described below, it is demonstrated that by using the system and method of the present invention, (1) the battery lifecycle of hardware in an SP100 network is extended by more than 60%; (2) the cost of an SP100 system is significantly reduced due to reduction in the required number of WIDs and WGDs; and (3) spectrum utilization is reduced by at least 55%. These benefits are accomplished while maintaining the design requirements for plant applications such as closed-loop regulatory and supervisory control, open-loop control, alerting, and remote monitoring/logging.

BRIEF DESCRIPTION OF THE DRAWINGS

The foregoing summary, as well as the following detailed description of preferred embodiments of the invention will be best understood when read in conjunction with the attached drawings. For the purpose of illustrating the invention, there are shown in the drawings embodiments which are presently preferred. It should be understood, however, that the invention is not limited to the precise arrangements and instrumentalities shown. In the drawings the same numeral is used to refer to the same or similar elements or steps, in which:

FIGS. 3A, 3B and 3C are schematic diagrams of a wireless end device, a wireless intermediate device and a wireless gateway device used in conjunction with the system and method of the present invention;

FIG. 4 is a block diagram of a basic computing device configuration in accordance with embodiments of the present invention;

FIG. 5 is a schematic block diagram including a route optimization module in accordance with an embodiment of the present invention;

FIG. 6 is a flow chart of a method of assigning reliable paths for an source-destination pair in accordance with the present invention;

DETAILED DESCRIPTION OF THE INVENTION

Figure 1A:
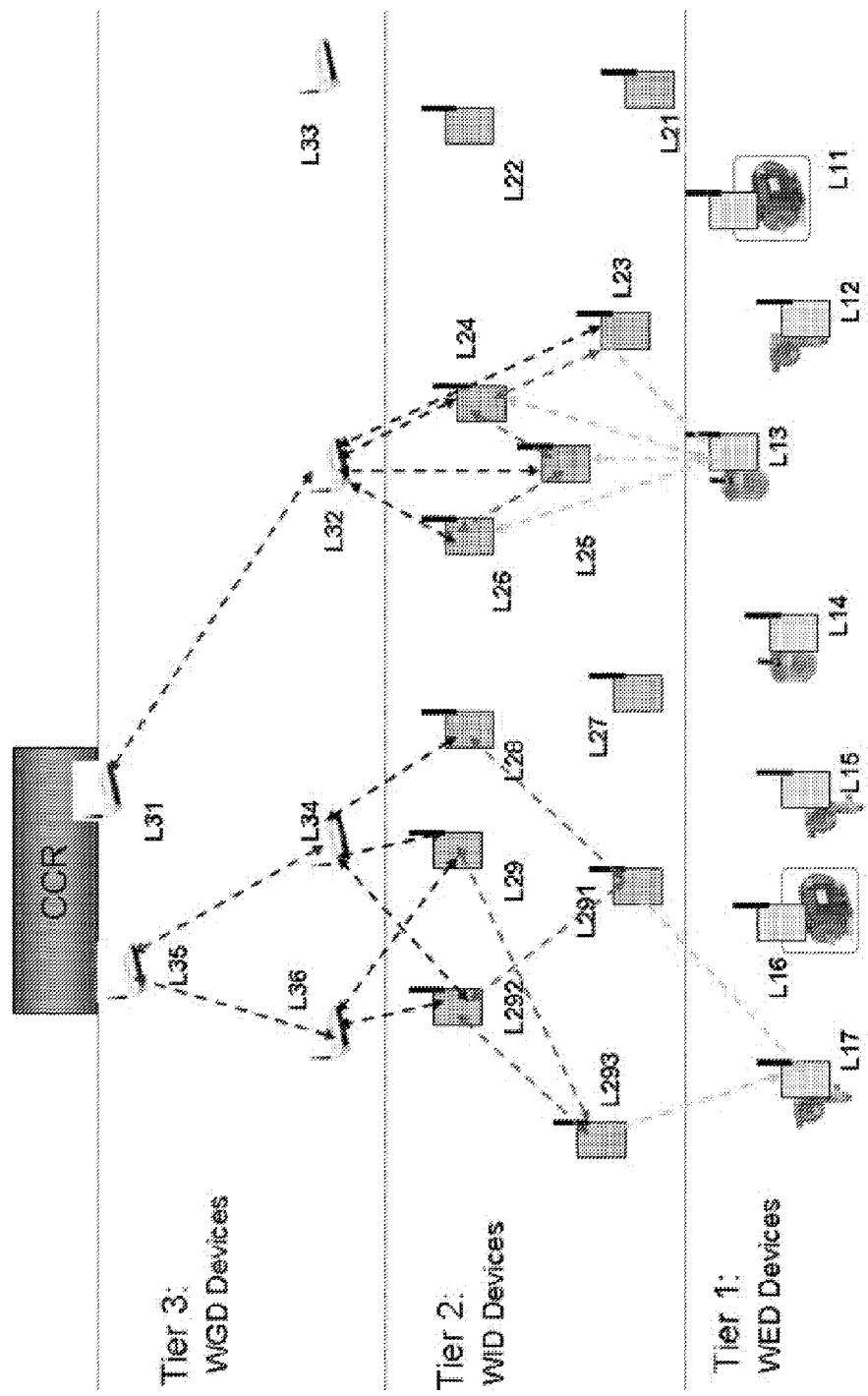
FIG. 1A is a schematic diagram of a wireless process control and/or automation network architecture.
Figure 1B:
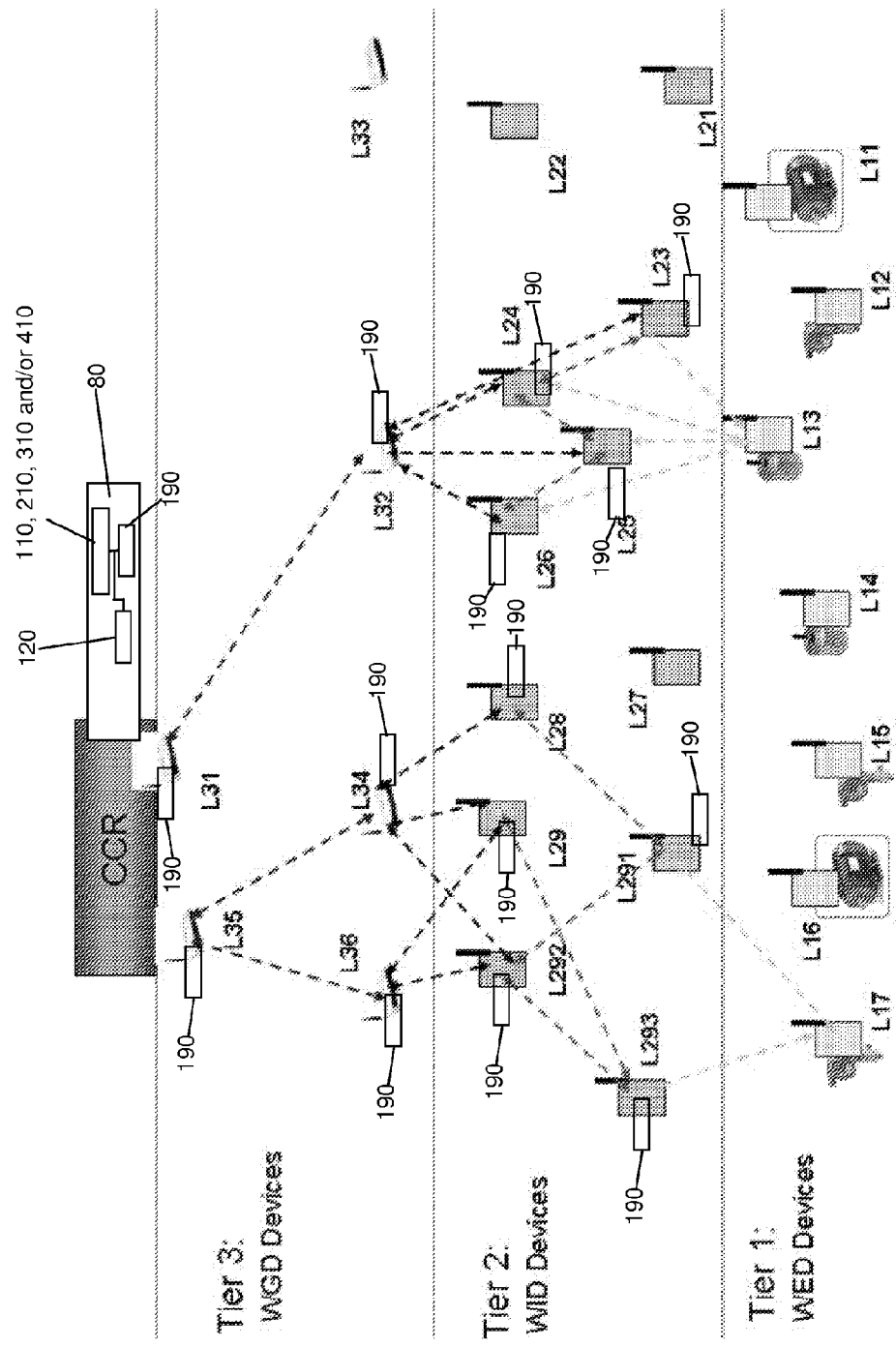
FIG. 1B is a schematic diagram of a wireless process control and/or automation network architecture in accordance with the present invention.

FIG. 1B is a diagram of a wireless process control and/or automation network such as one following the ISA-SP100 protocol; only connectivity for WEDs L17 and L13 to WGDs L35 and L31, respectively, is illustrated. The path L17-L293-L292-L36-L35 is one of the paths of the source-destination pair of L17 and the central control room (CCR). The combination L292-L35 is considered one of the links within this path. The path L17-L291-L28-L34-L35 is a path independent from L17-L293-L292-L36-L35, since no single intermediate link is common to the two paths. Elements L11 through L17 are WEDs at tier 1; elements L21 through L29 and L291 through L293 are WIDs at tier 2; and elements L31 through L36 are WGDs at tier 3. In the architecture shown in FIG. 1, the WGD L31 at the CCR is referred to as a master WGD, and the other WGDs L32 through L36 are additional WGDs that can provide additional links and/or serve as backup gateway devices in the event that the master WGD fails. In accordance with the present invention, a computing device 80 is provided that executes the route optimization module 110, the end-to-end delay minimization module 210, the tier delay minimization module 310, the delay minimization module 410, other modules that apply constrains including one or more of throughput and number of hops, or a combination including at least one of the foregoing modules, to create the routing table 190, and downloads the resulting routing table 190 to the routing WIDs and WGDs.

Figure 2:
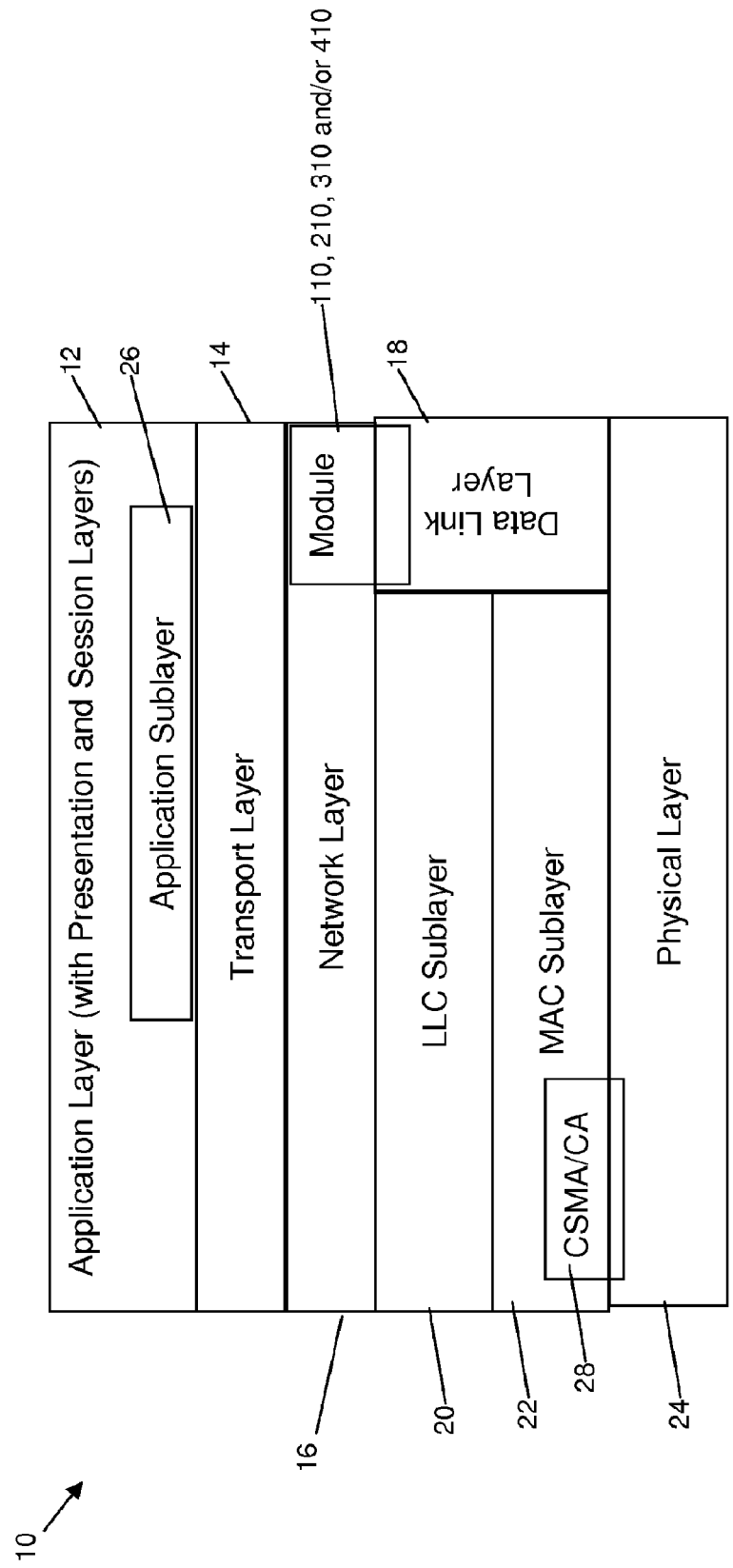
FIG. 2 is a schematic diagram of architecture of a wireless process control and/or automation network according to certain embodiments of the present invention.

FIG. 2 shows an exemplary architecture 10 of a wireless process control and/or automation system. The architecture generally follows the Open Systems Interconnection Reference Model (OSI model), and includes: an application layer 12, a transport layer 14, a network layer 16, data link layer 18 including a logical link control sublayer 20 and a media access control sublayer 22, and a physical layer 24. The application layer 12 includes the functionality of presentation and session layers according to a wireless process control and/or automation protocol such as the ISA-SP100 protocol, and generally provides the interface to user application processes. The application layer 12 further includes an application sublayer 26 that provides a wireless process control and/or automation protocol interface. The transport layer 14 provides for the addressing of user application processes via selection of a specific application layer entity. The network layer 16 provides network-wide addressing of devices and relays messages between network layer entities of different devices. Furthermore, in accordance with embodiments of the present invention, the network layer supports frame routing between source-destination pairs based upon the route optimization module 110 of the present invention. The data link layer 18 generally manages use of the physical layer, and includes the logical link control (LLC) sublayer 20 and the medium access control (MAC) sublayer 22, and can also carry out some of the optimization functionalities in adaptive methods and systems of the present invention, such as collecting frame error rate data, throughput data and/or delay statistics, and passing that data to the route optimization module 110. The LLC sublayer 20 provides multiplexing and flow control mechanisms, and generally acts as an interface between the MAC sublayer 22 and the network layer 16. The MAC sublayer provides multiple access methods including the carrier sense multiple access with collision avoidance (CSMA-CA) protocol 28 commonly used in wireless networks, which is also carried out in the physical layer 24. Finally, the physical layer 24 provides bit-by-bit delivery of data, a standardized interface transmission media including radio interfacing, modulation, and physical network topology such as mesh or star networks. In addition, channels assignments and/or changes are carried out in the network layer 24 and the data link layer 18.

FIG. 3A shows a block diagram of a WED 30 for receiving data from, and transmitting data to, one or more networked WIDs and/or WGDs. WED 30 generally includes a processor 32, such as a central processing unit, a wireless transceiver 34 and associated antenna 36, an input/output interface 40, a clock 45 and support circuitry 42. The processor 32, wireless transceiver 34, input/output interface 40, clock 45 and support circuitry 42 are commonly connected via a bus 44, which also connects to a memory 38. Memory 38 can include both volatile (RAM) and non-volatile (ROM) memory units, and stores software or firmware programs in a program storage portion and stores data in a data storage portion. The input/output interface 40 sends and receives information via a communication link to and from the associated end devices 46, e.g., process equipment such as meters, remote terminal units, valves, sensors, tank level measuring devices, and the like. The WED 30 can transmit to and receive from all other devices. In a receiving mode, the WED 30 receives instructions via the antenna 32 and transceiver 34. These instructions are processed by the processor 32 and can be stored in memory 38 for later use or cached. A timestamp is preferably added to the data with the clock 45, or alternatively, with a global positioning system. All devices in the network are synchronized to allow for accurate delay calculations as described below. The instructions are conveyed to the end device via the port 40. In a transmission mode, data is conveyed from the end device to the port 40, and passed to memory 38. The data can be processed by the processor 36 including a timestamp generated by clock 45 or other means, and sent across the network through the transceiver 34 and antenna 32. The processor 32 generally operates using the OSI model described above for end devices, and carries out instructions for transmission and receipt of data.

FIG. 3B shows a block diagram of a WID 50 for transmitting to and receiving from all other devices, and for routing to other devices. WID 50 generally includes a processor 52, such as a central processing unit, a wireless transceiver 54 and associated antenna 56, a clock 65 and support circuitry 62. The processor 52, wireless transceiver 54, clock 65 and support circuitry 62 are commonly connected via a bus 64, which also connects to a memory 58. Memory 58 commonly can include both volatile (RAM) and non-volatile (ROM) memory units, and stores software or firmware programs in a program storage portion and stores data in a data storage portion. A routing table 190 specified in accordance with the present invention resides in memory 58, i.e., in the data storage portion. In a receiving mode, the WID 50 receives data frames via the antenna 56 and transceiver 54. The data is generally cached in memory 58, for instance, for transmission when specified by the CSMA-CA protocol, or for retransmission in the event of a failed frame transmission. In a transmission mode, data is conveyed from the memory to the transceiver 54 under control of the processor 52. In a receiving mode, the WID 50 receives data frames via the antenna 56 and transceiver 54. In a routing mode, data frames are received and transmitted. The clock 65 or other means such as a global positioning system can add timestamps to received, transmitted and/or routed data. The WID 50 has sufficient intelligence to be able to address and route to specific communication devices. The processor 52 generally operates using the OSI model described above for intermediate devices, and carries out instructions for transmission, receipt and routing of data.

FIG. 3C shows a block diagram of a WGD 70 for transmitting to and receiving from all other devices, for routing to other devices, and in certain embodiments of the present invention for conducting high level applications including protocol translation and assignment of paths for source-destination pairs. WID 70 generally includes a processor 72, such as a central processing unit, a wireless transceiver 74 and associated antenna 76, a clock 85 and support circuitry 82. The processor 72, wireless transceiver 74, clock 85 and support circuitry 82 are commonly connected via a bus 84, which also connects to a memory 78. Memory 78 commonly can include both volatile (RAM) and non-volatile (ROM) memory units, and stores software or firmware programs in a program storage portion and stores data in a data storage portion. A routing table 190 specified in accordance with the present invention resides in memory 78, i.e., in the data storage portion. Furthermore, in certain embodiments of the present invention, the program storage portion of the memory 78 can include a routing optimization module 110 and a set of routing rules 120. In receiving, transmission and routing modes, the WGD 70 operates in a manner similar to the operation of the WID 50. The processor 72 generally operates using the OSI model described above for gateway devices, and carries out instructions for transmission, receipt and routing of data. The WGD 70 has sufficient intelligence to be able to address and route to specific communication devices. In addition, in certain embodiments of the present invention, the processor 72 of the WGD 70, in particular a master WGD 70 executes the logic for the route optimization module 110, the end-to-end delay minimization module 210, the tier delay minimization module 310, the delay minimization module 410, other modules that apply constrains including one or more of throughput and number of hops, or a combination including at least one of the foregoing modules, and the path assignments are stored in the routing table 190. In embodiments where the route optimization module and associated logic is carried out in other computing devices, the routing table 190 can be downloaded directly to the WIDs and WGDs for use during data routing operations, or transmitted through the wireless network in data frames and stored where required, i.e., in the routing WIDs and WGDs.

In certain embodiments of the present invention, the tier containing the WIDs can be bypassed, such that the WEDs transmit to, and receive from, WGDs. For instance, such a configuration is common in a wireless HART® protocol. In additional embodiments, WIDs can transmit frames to, and receive frames from, other WIDs, for instance, whereby WGDs are bypassed.

The following definitions and symbols are used herein to facilitate the description of the route optimization module and associated system and method of the present invention:

i denotes usage class as described above, and can be 0, 1, 2, 3, 4 or 5;

j denotes the tier of the wireless device and can be 1, 2 or 3;

$D_i$ denotes the traffic distribution, i.e., percentage of the total traffic, for class i;

$N_P$ denotes the number of possible paths between a source and a destination;

$N_i^{opt}$ denotes the minimum number of paths for a source-destination pair in usage class i;

x denotes the path number, i.e. x=1, 2, 3, ..., $N_P$; e.g., x=5 mean the $5^{th}$ path out of $N_P$ paths;

|L(x)| denotes the number of intermediate links for the x-th path;

$|L_i^{opt}|$ denotes the maximum number of intermediate links for a path for a source-destination pair in usage class i;

L(x, y) denotes the y-th link of the x-th path, for y=1, 2, 3, ..., |L(x)|;

$\Phi(L(x, y))$ denotes the frame error probability for the y-th link of the x-th path, and the link reliably profile is a matrix consisting of all [1−$\Phi(L(x, y))$];

$\Phi(x)$ denotes the frame error probability for the x-th path, e.g., $\Phi(2)$ is the frame error probability of path 2, $\Phi(2,5)$ is the effective frame error probability for the combined path 2 and 5;

1−$\Phi_c(i)$ denotes the end-to-end reliability requirements for class i;

$\Phi_c(i)$ denotes the end-to-end frame error probability requirements for class i;

α denotes the maximum allowable frame error probability for a single link;

η(L(x, y)) is the existing throughput for the y-th link of the x-th path;

η(L(x, y), max) is the maximum throughput for the y-th link of the x-th path;

ψ(j, i, x) denotes the calculated delay in tier j for class i going through path x, and the tier delay profile is a matrix for all ψ(j, i, x);

ψ(i, j, max) denotes the maximum allowable delay in tier j for class i;

ψ(i, x) denotes the calculated delay for a particular path x for class i; and

ψ(i, max) denotes the maximum allowable end-to-end delay for class i.

Table 1 represents process control system requirements based upon each usage class:

TABLE 1

| Class (i) | Class Description | Traffic Distribution $D_i$ | Reliability Requirements 1 − $\Phi_c(i)$ | Delay Requirements ψ(i, j, max), ψ(i, max) |
|---|---|---|---|---|
| 0 | Safety & Emergency Actions | $D_0$ | 1 − $\Phi_c(0)$ | ψ(0, j, max), ψ(0, max) |
| 1 | Closed-Loop Regulatory Control | $D_1$ | 1 − $\Phi_c(1)$ | ψ(1, j, max), ψ(1, max) |
| 2 | Closed-Loop Supervisory Control | $D_2$ | 1 − $\Phi_c(2)$ | ψ(2, j, max), ψ(2, max) |
| 3 | Open-Loop Control | $D_3$ | 1 − $\Phi_c(3)$ | ψ(3, j, max), ψ(3, max) |
| 4 | Alerting | $D_4$ | 1 − $\Phi_c(4)$ | ψ(4, j, max), ψ(4, max) |
| 5 | Logging | $D_5$ | 1 − $\Phi_c(5)$ | ψ(5, j, max), ψ(5, max) |

The following description and related equations set forth an exemplary process and route optimization module for determining and assigning one or more reliable paths for a source-destination pair. However, one of ordinary skill in the art will appreciate that deviations from the set of equations that follow, including variations in sequence and precise definition of terms, can result in the same or an equivalent determination and assignment. Accordingly, in accordance with an embodiment of the present invention, the method steps described with respect to FIGS. 5 and 6, FIGS. 7 and 8, FIGS. 9 and 10, FIGS. 11 and 12, and variations thereof, are implemented as a module, or set of instructions, in a computing device, which can include a WGD or a separate computing device. In the case of the module being executed by a WGD, the module can be executed in a master wireless gateway device, for instance, located in the CCR, or alternatively by one or more of the additional wireless gateway devices within tier 3.

In embodiments in which the one or more modules 110, 210, 310, 410 are executed by a separate computing device, the end results, i.e., the assignment and determination of one or more reliable paths between a selected source-destination pair, can be ascertained and uploaded to one or more of the wireless gateway devices. In certain embodiments employing a separate computing device, an adaptive system is provided whereby communication between the separate computing device and one or more WGDs is maintained continuously (wired or wireless). In an adaptive system, one or more WGDs can be programmed to look to the separate computing device to determine and assign new paths between one or more selected source-destination pairs. In alternative embodiments, the WGDs and WIDs can communicate with the separate computing device periodically to receive updates. In further alternative embodiments, one or more WGDs and/or WIDs can instruct the separate computing device to execute the route optimization module of the present invention to alter assignments when performance degradation is detected, for example, in the case of one or more bad links or nodes within the wireless process control and/or automation network.

An exemplary block diagram of a computer system 80 in which the route optimization module of the present invention can be implemented is shown in FIG. 4. Computer system 80 includes a processor 82, such as a central processing unit, an input/output interface 90 and support circuitry 92. In certain embodiments, where the computer 80 requires a direct human interface, a display 96 and an input device 98 such as a keyboard, mouse or pointer are also provided. The display 96, input device 98, processor 82, and support circuitry 92 are shown connected to a bus 94 which also connects to a memory 98. Memory 98 includes program storage memory 111 and data storage memory 191. Note that while computer 80 is depicted with direct human interface components display 96 and input device 98, programming of modules and exportation of data can alternatively be accomplished over the interface 90, for instance, where the computer 80 is connected to a network and the programming and display operations occur on another associated computer, or via a detachable input device as is known with respect to interfacing programmable logic controllers.

Program storage memory 111 and data storage memory 191 can each comprise volatile (RAM) and non-volatile (ROM) memory units and can also comprise hard disk and backup storage capacity, and both program storage memory 111 and data storage memory 191 can be embodied in a single memory device or separated in plural memory devices. Program storage memory 111 stores software program modules and associated data, and in particular stores a route optimization module 110, the end-to-end delay minimization module 210, the tier delay minimization module 310, the delay minimization module 410, other modules that apply constrains including one or more of throughput and number of hops, or a combination including at least one of the foregoing modules. Data storage memory 191 stores a set of routing rules 120 and a routing table 190 generated by the one or more modules of the present invention.

It is to be appreciated that the computer system 80 can be any computer such as a personal computer, minicomputer, workstation, mainframe, a dedicated controller such as a programmable logic controller, or a combination thereof. While the computer system 80 is shown, for illustration purposes, as a single computer unit, the system may comprise a group/farm of computers which can be scaled depending on the processing load and database size. In addition, as described above, the functionality of the computer system 80 can be executed by one or more of the WGDs.

The computing device 80 preferably supports an operating system, for example stored in program storage memory 111 and executed by the processor 82 from volatile memory. According to an embodiment of the invention, the operating system contains instructions for interfacing the device 80 to the wireless process control and/or automation network, including the route optimization module of the present invention as more fully discussed herein.

FIG. 5 is a schematic block diagram of a wireless process control and/or automation network routing system 100 according to an embodiment of the present invention. In general, the wireless process control and/or automation network routing system 100 includes a route optimization module 110, a set of routing rules 120, e.g., in the form of a routing table, and hardware 80 for executing the route optimization module 110 based on the set of routing rules 120. In general, the route optimization module 110 is executable by suitably interconnected hardware 80, such as one or more wireless gateway devices 80a, a separate computing device 80b, a combination of one or more wireless gateway devices 80a and a separate computing device 80b, or other known processing device.

The set of routing rules 120 is commonly in the form of a rule table, although one of ordinary skill in the art of computer science will appreciate that the set of rules can be in a format other than a table, e.g., a database, a directory, or other type of file structure. The set of routing rules 120 in the form of a rule table includes a source column 122, a destination column 124, a usage class column 126, a minimum reliability requirement $1-\Phi_c(i)$ column 128 and a column 130 specifying the minimum number of paths $N_i^{opt}$ in a source-destination pair per usage class. In general, the rules are specified for end-to-end source-destination pairs, although in certain embodiments it can be desirable to specify rules for other source-destination pairs. For example, a destination WGD can be provided with communication to the CCR outside of the route optimization module 110 of the present invention. The route optimization module 110 uses this set of routing rules 120 in the for certain steps or sub-modules as described further herein. The set of routing rules 120 can be stored in the hardware 80, or in a separate and accessible computer memory device, depending, for instance, upon the desired system configuration.

Still referring to FIG. 5, and also referring to FIG. 6, the operation of an embodiment of the route optimization module 110 is shown in more detail. A path determination sub-module 150 determines at step 152 possible paths between a selected source-destination pair. For example, referring to FIG. 1, for the source-destination pair of the wireless end device L17 and the wireless gateway device L35, the paths shown by dashed lines include:
  (i) L17-L293-L292-L36-L35;
  (ii) L17-L293-L29-L36-L35;
  (iii) L17-L293-L29-L34-L35; and
  (iv) L17-L291-L292-L36-L35;
  (v) L17-L291-L292-L34-L35;
  (vi) L17-L291-L28-L34-L35;
  (vii) L17-L293-L292-L291-L28-L34-L35;
  (viii) L17-L291-L292-L293-L29-L36-L35;
  (ix) L17-L291-L292-L293-L29-L34-L35.
For the source-destination pair of the wireless end device L13 and the wireless gateway device L31 at the central control room, the paths shown by dashed lines include:
  (i) L13-L23-L24-L32-L31;
  (ii) L13-L23-L32-L31;
  (iii) L13-L24-L23-L32-L31;
  (iv) L13-L24-L32-L31;
  (v) L13-L24-L25-L32-L31;
  (vi) L13 L24 L25 L26 L32 L31;
  (vii) L13-L25-L32-L31;
  (viii) L13-L26-L32-L31
  (ix) L13-L25-L24-L32-L31
  (x) L13-L26-L25-L32-L31; and
  (xi) L13 L26 L25 L24 L32 L31.
Note that while paths show that data frames generally hop from a tier 1 node to one or more tier 2 nodes, and then to one or more tier 3 nodes, in certain embodiments a path can include data frames that hop from a tier 2 node to a tier 3 node, back to a tier 2 node and back to a tier 3 node, whereby duplication of nodes within a path is generally avoided. However, as described further herein, such paths having a larger number of hops will likely be eliminated from consideration in preferred embodiments of the present invention. Of course, one of ordinary skill in the art will recognize that other paths not specifically marked in FIG. 1 are possible.

Next, a reliability calculation sub-module 160 calculates at step 162 the reliability of each of the possible paths, calculated from a link reliability profile. In certain alternative embodiments, the listing of all of the paths can be preliminarily filtered to eliminate those that are greater than a maximum number of links for a given usage class i, $|L_i^{opt}|$. For example, if $|L_i^{opt}|$ is specified as five for all usage classes, an excessive path link filter sub-module can be applied to discard from the routing table 190 paths with more than five links, i.e., $|L(x)|>|L_i^{opt}|$, such as paths (vii), (viii) and (ix) of the source-destination pair of the wireless end device L17 and the wireless gateway device L35. Likewise, an excessive path link filter sub-module can be applied to discard from the routing table 190 paths (vi) and (xi) related to the source-destination pair of the wireless end device L13 and the wireless gateway device L31.

In additional and/or alternative embodiments, as described further herein, the link reliability profile data can be obtained from empirical data of frame error rates of each link, or derived from estimates calculated based upon the type of hardware and network loading. For instance, an exemplary profile of link FER values is given in Table 2 below:

TABLE 2

| Source | Destination | Link FER $\Phi(L(x, y))$ |
|---|---|---|
| L13 | L23 | 1.00E−05 |
| L13 | L24 | 1.00E−06 |
| L13 | L25 | 5.00E−07 |
| L13 | L26 | 1.00E−07 |
| L23 | L32 | 5.00E−04 |
| L24 | L32 | 5.00E−06 |
| L25 | L32 | 5.00E−04 |
| L26 | L32 | 5.00E−03 |

The reliability $1-\Phi(x)$ for a path x is calculated from the link reliability profile data in Table 2 as follows:

$$1 - \Phi(x) = \prod_{y=1}^{|L(x)|} (1 - \Phi(L(x, y))). \quad (1)$$

Calculations in accordance with Equation (1) are repeated for each path x for each source-destination pair.

It is noted that a link in a path having a relatively low reliability will adversely affect the entire path performance, even if the remaining links have relatively high reliabilities. Therefore, it is advantageous to provide links with a small variance in reliability within a path. In certain preferred embodiments, this is accomplished by ensuring that:

$$\Phi(L(x,y)) \leq \alpha \text{ for all } y \quad (2).$$

Paths x that include links y that do not meet Equation (2) are eliminated from consideration.

It is well known that the simultaneous transmission of a frame over two independent paths connecting a source and destination creates a higher reliability than if the frame were only transmitted via a single path. Applied to the present invention, when combining two independent paths, namely $x_1$ and $x_2$, the effective reliability is expressed as:

$$1-\Phi(x_1,x_2)=1-\Phi(x_1)*\Phi(x_2) \quad (3),$$

and for $N_P$ independent paths, the effective reliability of the combined $N_P$ paths, denoted by $1-\Phi(x_1, x_2, \ldots, x_{N_p})$, is given by:

$$1 - \Phi(x_1, x_2, \ldots, x_{N_p}) = 1 - \prod_{w=1}^{N_p} (\Phi(x_w)). \quad (4)$$

In certain embodiments, in addition to calculating the reliability of each of the possible paths, or effective reliability of groups of paths, at step 162, sub-module 160 or another sub-module (not shown) performs an optional step 163 (shown by dashed lines) in which the throughput, number of hops, delay (tier and/or end-to-end), or a combination of one or more of throughput, number of hops and delay, for each of the possible paths is determined or calculated. This determination or calculation can be used in path selection to assign one or more paths that meet multiple constraints.

In additional embodiments, sub-module 160, and in particular step 162 and optionally step 163, considers statistics from the wireless process control and/or automation network, indicated by step 164 in dashed lines. Step 162 can determine reliability of each of the possible paths based on frame error rate statistics determined at each link, node and/or path. In addition, step 163 can obtain statistics at step 164 related to one or more of determined reliability, calculated throughput, calculated end-to-end delay and calculated tier delay.

A reliable path identification sub-module 170, at step 172 identifies and selects a path, i.e., reliable paths $1-\Phi(x)$, or set of paths, i.e., $1-\Phi(x_1, x_2)$ or $1-\Phi(x_1, x_2, \ldots, x_{N_p})$, from the possible paths x between a selected source-destination pair. The selected path or set of paths is identified by comparison to the minimum reliability requirements $1-\Phi(i)$ specified in the set of routing rules 120. Accordingly, paths meeting the following conditions are identified as reliable:

$$1-\Phi(x) \geq 1-\Phi(i) \text{ for each usage class} \quad (5), \text{ and}$$

$$|L(x)| \text{ is smallest} \quad (6).$$

Note that in circumstances in which combined independent paths are selected, i.e., a selected group of paths, the comparison of Equation (5) is carried out substituting $1-\Phi(x_1, x_2)$ calculated from Equation (3) or $1-\Phi(x_1, x_2, \ldots, x_{N_p})$ calculated from Equation (4) for $1-\Phi(x)$.

In certain embodiments, the paths and/or group of paths can be selected based on the condition that $|L(x)|$ satisfies the following constraint:

$$|L_i^{opt}| \geq |L(x)| \quad (7).$$

Finally, a path assignment sub-module 180 assigns at step 182 the minimum number of reliable paths for the selected source-destination pair based on the minimum number of paths $N_i^{opt}$ for a source-destination pair specified in the set of routing rules 120. These paths can be then assigned in a path routing table 190, where the notations "A," "B," "C" and "D" refer to different paths that meet the conditions of Equation (5) and have the lowest $|L(x)|$. Where the number of paths having the lowest $|L(x)|$ value do not meet the minimum number of paths $N_i^{opt}$ for a source-destination pair, the path(s) having the next largest $|L(x)|$ are assigned so that the minimum number of paths $N_i^{opt}$ for a source-destination pair is provided. In the alternative, the paths selected satisfy the conditions of Equation (7). As described further herein, in optional embodiments of the present invention, at step 182, the path assignment sub-module 180 also considers additional constraints in assigning paths to the path routing table 190, including throughput, delay (end-to-end and/or tier), number of hops, or a combination of one or more of throughput, number of hops and delay, as indicated by step 183 in dashed lines.

Furthermore, in additional embodiments of the present invention, the path assignment step 182 is iterative, wherein, based upon network statistics related to one or more of calculated reliability, number of hops, calculated throughput, calculated end-to-end delay and calculated tier delay, certain paths are discarded and replaced with additional paths to meet the minimum number of paths $N_i^{opt}$ for a source-destination pair. This optional embodiment allows the system and method to be adaptive to continuously maintain optimal network traffic flow, and is comprehended in FIG. 6 with a dashed connector between steps 162 and 182.

In certain embodiments, several combinations of paths or groups of paths will meet the requirements of Equations (5)-(6). In these cases, the selection of the paths should seek a uniform distribution of traffic over the network. The method of the present invention therefore assigns the minimum number of paths $N_i^{opt}$ for a source-destination pair and in certain embodiments additional alternate paths. For instance, as shown in path routing table 190, up to two alternate paths are provided. The remaining set of paths $N_p-(N_i^{opt}+2)$ are discarded.

For a particular source-destination pair, during normal operating conditions, data traffic is routed through the assigned paths rather than the alternate paths. However, if degradation in the usage class performance is sensed at either end, or at one of the links or nodes in an assigned path, data traffic passes through both the assigned paths and the alternate paths.

In certain alternative embodiments of the present invention, the minimum number of paths $N_i^{opt}$ for a source-destination pair is dynamically adjusted based on the usage class reliability requirements $1-\Phi_c(i)$ and variations in network and/or traffic loading. The minimum number of paths $N_i^{opt}$ that meet the network reliability requirements can be determined such that:

$$\Phi(N_i^{opt}) \leq \Phi_c(i), \text{ for all } i \qquad (8)$$

In an additional embodiment of the present invention, consideration is given to a maximum allowable delay in assignment of particular paths for a source-destination pair. Accordingly, if the calculated delay exceeds the maximum allowable delay for a given path, another path, e.g., a set of WED, WID, and/or WGD, can be added to minimize delay. Alternatively, or in conjunction, another radio frequency channel and/or hopping pattern can be employed to minimize delay for the given path.

In certain embodiments in which the path assignment is based on usage class, one or more paths x are assigned such that the following conditions are satisfied:

$$\psi(j,i,x) \leq \psi(j,i,\text{max}) \text{ for all } j,i, \text{ and } x \qquad (9a), \text{ and}$$

$$\psi(i,x) \leq \psi(i,\text{max}) \text{ for all } i \text{ and } x \qquad (9b).$$

Paths x that do not meet the conditions of Equation (9a) or Equation (9b) are discarded in this embodiment.

In certain embodiments of the present invention, the maximum allowable delay is considered in selecting the minimum number of paths $N_i^{opt}$ for a source-destination pair based on satisfaction of Equations (9a) and (9b).

In further embodiments of the present invention, the method and system of the present invention defines a maximum allowable delay for frame transmission within each tier j, $\psi(i, j, \text{max})$, as a function of the class i. The sum of all values $\psi(i, j, \text{max})$ for all j should not exceed the maximum system delay constraints. Because wireless process control and/or automation networks can be sensitive to delay, maintaining the transport delay at each tier within the system maximum allowable delay is desirable to ensure proper operation.

Figure 7:
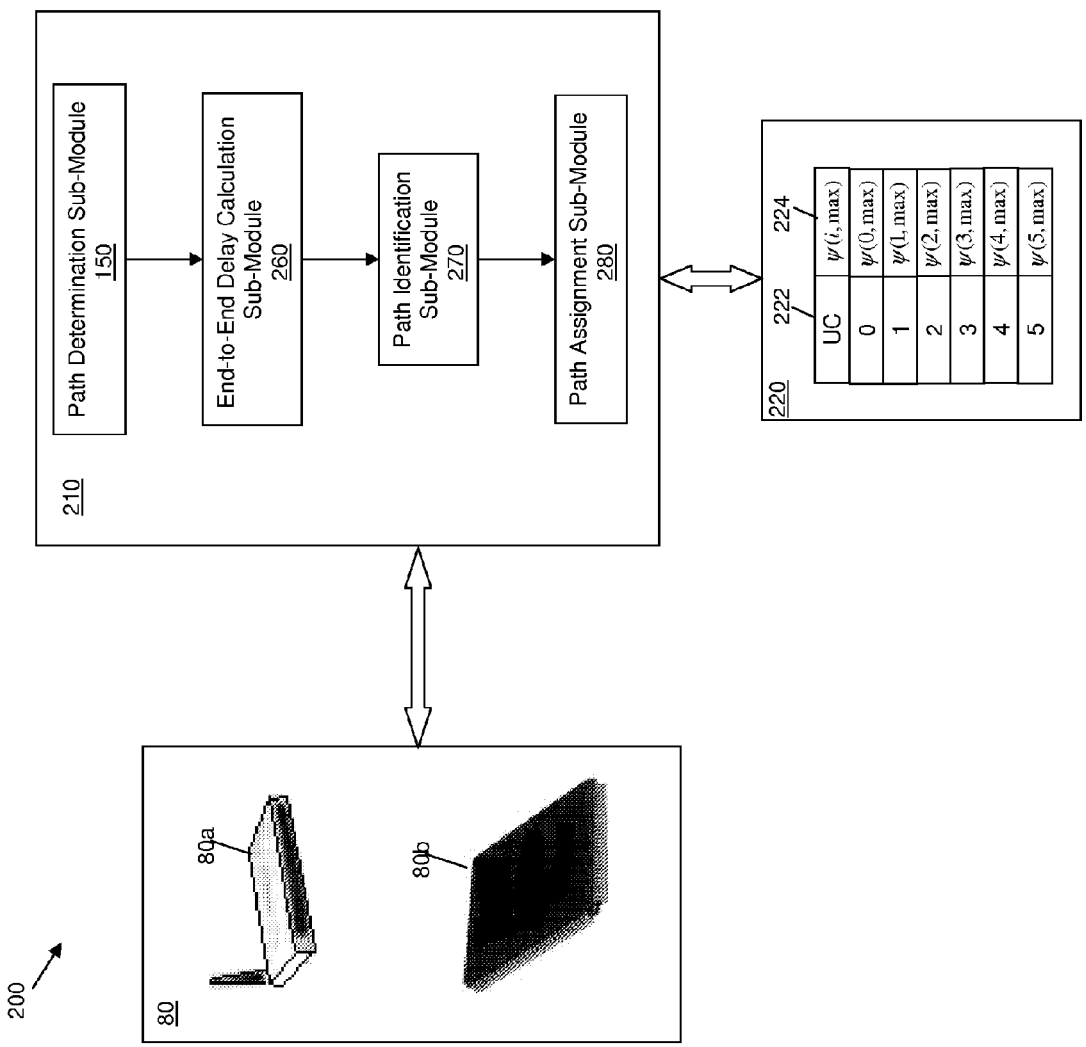
FIG. 7 is a schematic block diagram including an end-to-end delay minimization module in accordance with an embodiment of the present invention.

FIG. 7 is a schematic block diagram of a wireless process control and/or automation network routing system 200 according to another embodiment of the present invention. In general, the wireless process control and/or automation network routing system 200 includes an end-to-end delay minimization module 210, a set of maximum allowable end-to-end delay rules 220, e.g., in the form of a maximum allowable end-to-end delay table, and hardware 80 for executing the delay minimization module 210. In general, the delay minimization module 210 is executable by suitably interconnected hardware 80, such as one or more wireless gateway devices 80a, a separate computing device 80b, a combination of one or more wireless gateway devices 80a and a separate computing device 80b, or other known processing device. The end-to-end delay minimization module 210 generally includes a path determination sub-module 150, an end-to-end delay calculation sub-module 260, a path identification sub-module 270 and a path assignment sub-module 280.

Figure 8:
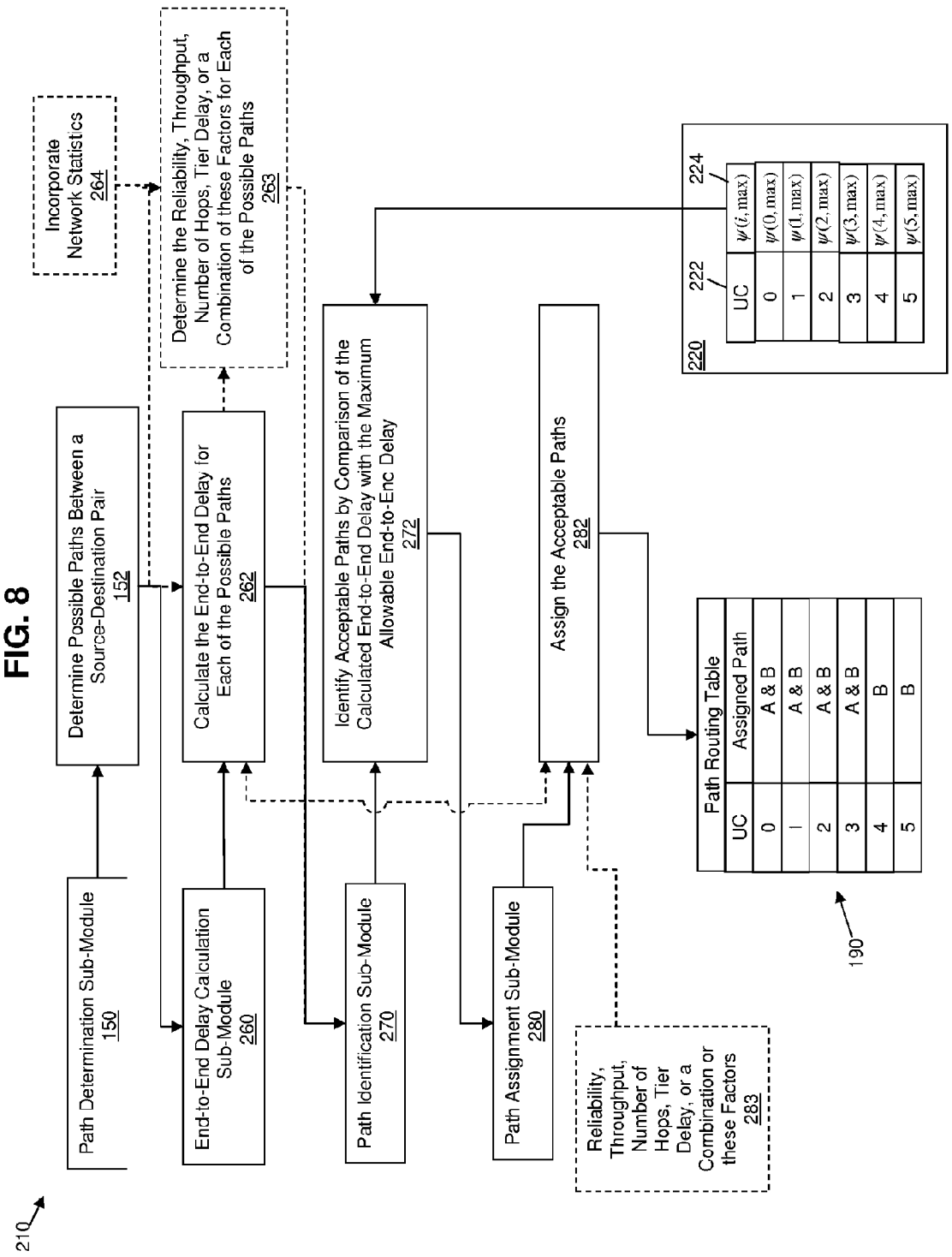
FIG. 8 is a flow chart of a method of assigning paths operating the end-to-end delay minimization module in accordance with the present invention.

Still referring to FIG. 7, and also referring to FIG. 8, the operation of an embodiment of the end-to-end delay minimization module 210 is shown in more detail. A path determination sub-module 150 determines at step 152 possible paths between a selected source-destination pair. This step 152 and module 150 operate, for instance, in the same manner as described above with respect to FIGS. 5 and 6.

Next, the end-to-end delay calculation sub-module 260 calculates at step 262 the end-to-end delay for each of the possible paths determined in step 152. These calculations can be based upon network statistics incorporated at step 264. For instance, each transmitted frame includes a timestamp with the time at which frame processing commences at the source. When the frame is received by the destination, a receipt timestamp is incorporated, and the end-to-end delay can be calculated based on the difference between the receipt time of the destination and the time that frame processing commenced at the source. This calculation accounts for all frame or packet processing time and transmission time at each node in the path.

In certain embodiments, in addition to calculating the end-to-end delay of each of the possible paths at step 262, sub-module 260 or another sub-module (not shown) performs an optional step 263 (shown by dashed lines) in which the reliability, throughput, number of hops, tier delay, or a combination of one or more of reliability, throughput, number of hops and tier delay, for each of the possible paths is determined or calculated. This determination or calculation can be used in path selection to assign one or more paths that meet multiple constraints.

Next, at step 272, the path identification sub-module 270 identifies acceptable paths by comparison of the calculated end-to-end delay with the maximum allowable end-to-end delay specified in the set of maximum allowable end-to-end delay rules 220. The set of maximum allowable end-to-end delay rules 220 includes, in certain embodiments, specified maximum allowable end-to-end delay 224 per usage class 222, denoted as $\psi(i, \text{max})$. Paths are identified as acceptable if Equation (9b) set forth above is satisfied.

Finally, a path assignment sub-module 280 assigns at step 282 the acceptable paths, i.e., paths that satisfy Equation (9b), to the routing table 190. In additional embodiments of the present invention, at step 282, the path assignment sub-module 280 also considers additional constraints in assigning paths to the path routing table 190, including minimum reliability (e.g., following the module 110 described with respect to FIGS. 5 and 6), maximum throughput, a maximum allowable tier delay, maximum number of hops, or a combination of one or more of minimum reliability, maximum throughput, maximum number of hops and minimum allowable tier delay, as indicated by step 283 in dashed lines.

During network transmission incorporating the system and method of the present invention, if a frame is received at the destination with a calculated end-to-end delay that exceeds the maximum allowable end-to-end delay, the path through which that frame passed will be identified in the network statistics as unacceptable for failing to satisfy the end-to-end delay constraint. This information will be used to dynamically discard that failed path from the routing table 190, and replace that path with one or more additional paths, for instance, if necessary to meet any other specified constraints.

In addition, in still further embodiments of the present invention, the path assignment step 282 is iterative, wherein, based upon network statistics related to one or more of calculated reliability, calculated throughput, number of hops and calculated tier delay, certain paths are discarded and replaced with additional paths. The iterative nature of the end-to-end delay minimization module 210 allows the system and method to be adaptive to continuously maintain optimal network traffic flow, and is comprehended in FIG. 8 with a dashed connector between steps 262 and 282.

Figure 9:
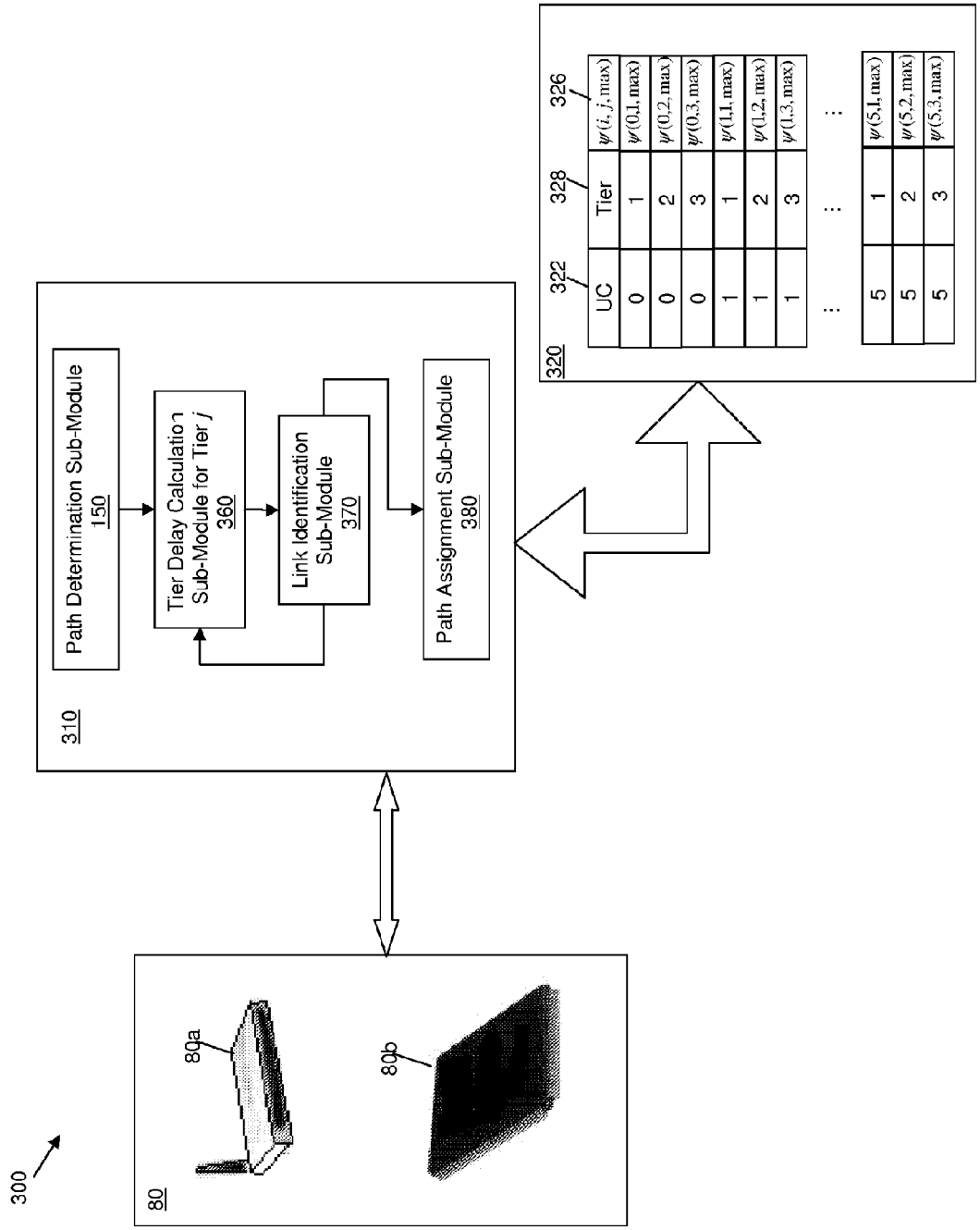
FIG. 9 is a schematic block diagram including a tier delay minimization module in accordance with an embodiment of the present invention.

FIG. 9 is a schematic block diagram of a wireless process control and/or automation network routing system 300 according to yet another embodiment of the present invention. In general, the wireless process control and/or automation network routing system 300 includes a tier delay minimization module 310, a set of maximum allowable tier delay rules 320, e.g., in the form of a maximum allowable tier delay table, and hardware 80 for executing the delay minimization module 310. In general, the delay minimization module 310 is executable by suitably interconnected hardware 80, such as one or more wireless gateway devices 80a, a separate computing device 80b, a combination of one or more wireless gateway devices 80a and a separate computing device 80b, or other known processing device. The tier delay minimization module 310 generally includes a path determination sub-module 150, a tier delay calculation sub-module 360, a link identification sub-module 370 and a path assignment sub-module 380.

Figure 10:
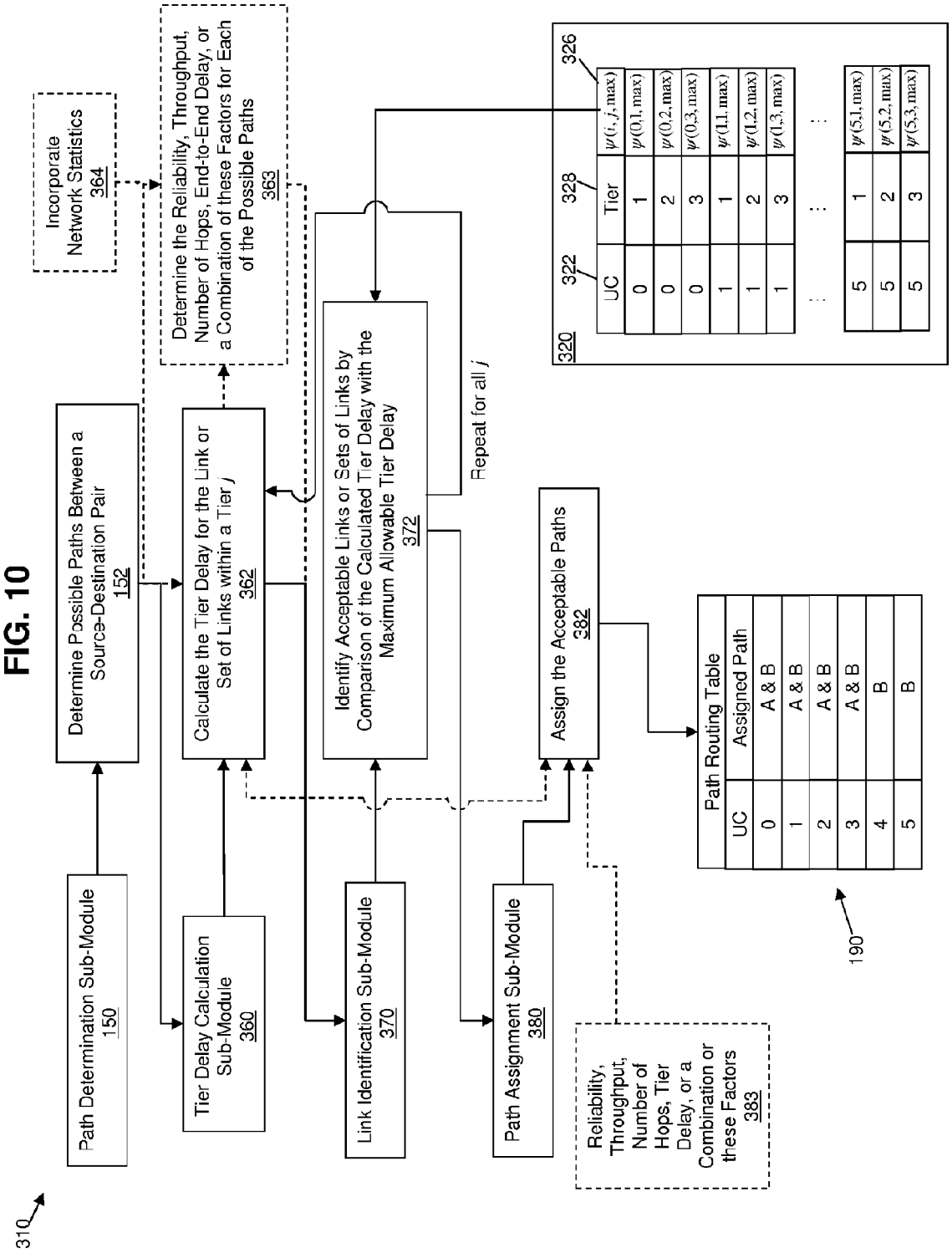
FIG. 10 is a flow chart of a method of assigning paths operating the tier delay minimization module in accordance with the present invention.

Still referring to FIG. 9, and also referring to FIG. 10, the operation of an embodiment of the tier delay minimization module 310 is shown in more detail. A path determination sub-module 150 determines at step 152 possible paths between a selected source-destination pair. This step 152 and module 150 operate, for instance, in the same manner as described above with respect to FIGS. 5 and 6.

Next, the tier delay calculation sub-module 360 calculates at step 362 the tier delay for each of the links or set of links in tier j for the possible paths determined in step 152. These calculations can be based upon network statistics incorporated at step 364. For instance, each transmitted frame includes a timestamp with the time at which frame processing commences at the source. When the frame is transmitted from the last node in the given tier, a transmission timestamp is incorporated, and the tier delay can be calculated based on the difference between the transmission time at the last node in the tier j and the time that frame processing commenced at the first node in the tier j. This calculation accounts for all frame or packet processing time and transmission time at each node in the path in tier j.

In certain embodiments, in addition to calculating the tier delay of each of the possible paths at step 362, sub-module 360 or another sub-module (not shown) performs an optional step 363 (shown by dashed lines) in which the reliability, throughput, number of hops, end-to-end delay, or a combination of one or more of reliability, throughput, number of hops and end-to-end delay, for each of the possible paths is determined or calculated. This determination or calculation can be used in path selection to assign one or more paths that meet multiple constraints.

Next, at step 372, the link identification sub-module 370 identifies acceptable links or sets of links by comparison of the calculated tier delay with the maximum allowable tier delay specified in the set of maximum allowable tier delay rules 320. The set of maximum allowable tier delay rules 320 includes, in certain embodiments, specified maximum allowable tier delay 326 per usage class i 322 per tier j 328, denoted as $\psi(j, i, max)$. A link or a set of links is identified as acceptable if Equation (9a) set forth above is satisfied. The steps 362 and 372 are repeated for each tier j within a path, or unless a calculated tier delay exceeds the maximum allowable tier delay, at which point the path is discarded.

Finally, after Equation (9a) is satisfied for all tiers within a given path, the path assignment sub-module 380 assigns at step 382 the acceptable paths to the routing table 190. In additional embodiments of the present invention, at step 382, the path assignment sub-module 380 also considers additional constraints in assigning paths to the path routing table 190, including reliability (e.g., following the module 110 described with respect to FIGS. 5 and 6), throughput, a maximum allowable end-to-end delay, number of hops, or a combination of one or more of throughput, number of hops and tier delay, as indicated by step 383 in dashed lines.

During network transmission incorporating the system and method of the present invention, if a frame is received at the end of a tier with a calculated tier delay that exceeds the maximum allowable tier delay, that frame will be dropped, and the link or set of links within the tier will be identified in the network statistics as unacceptable as failing to satisfy the end-to-end delay constraint. This information will be used to dynamically discard the one or more paths including that link or set of links from the routing table 190, and replace the one or more discarded paths with one or more additional paths, for instance, if necessary to meet any other specified constraints.

In addition, in still further embodiments of the present invention, the path assignment step 382 is iterative, wherein, based upon network statistics related to one or more of calculated reliability, calculated throughput, number of hops and calculated tier delay, certain paths are discarded and replaced with additional paths. The iterative nature of the tier delay module 310 allows the system and method to be adaptive to continuously maintain optimal network traffic flow, and is comprehended in FIG. 10 with a dashed connector between steps 362 and 382.

Figure 11:
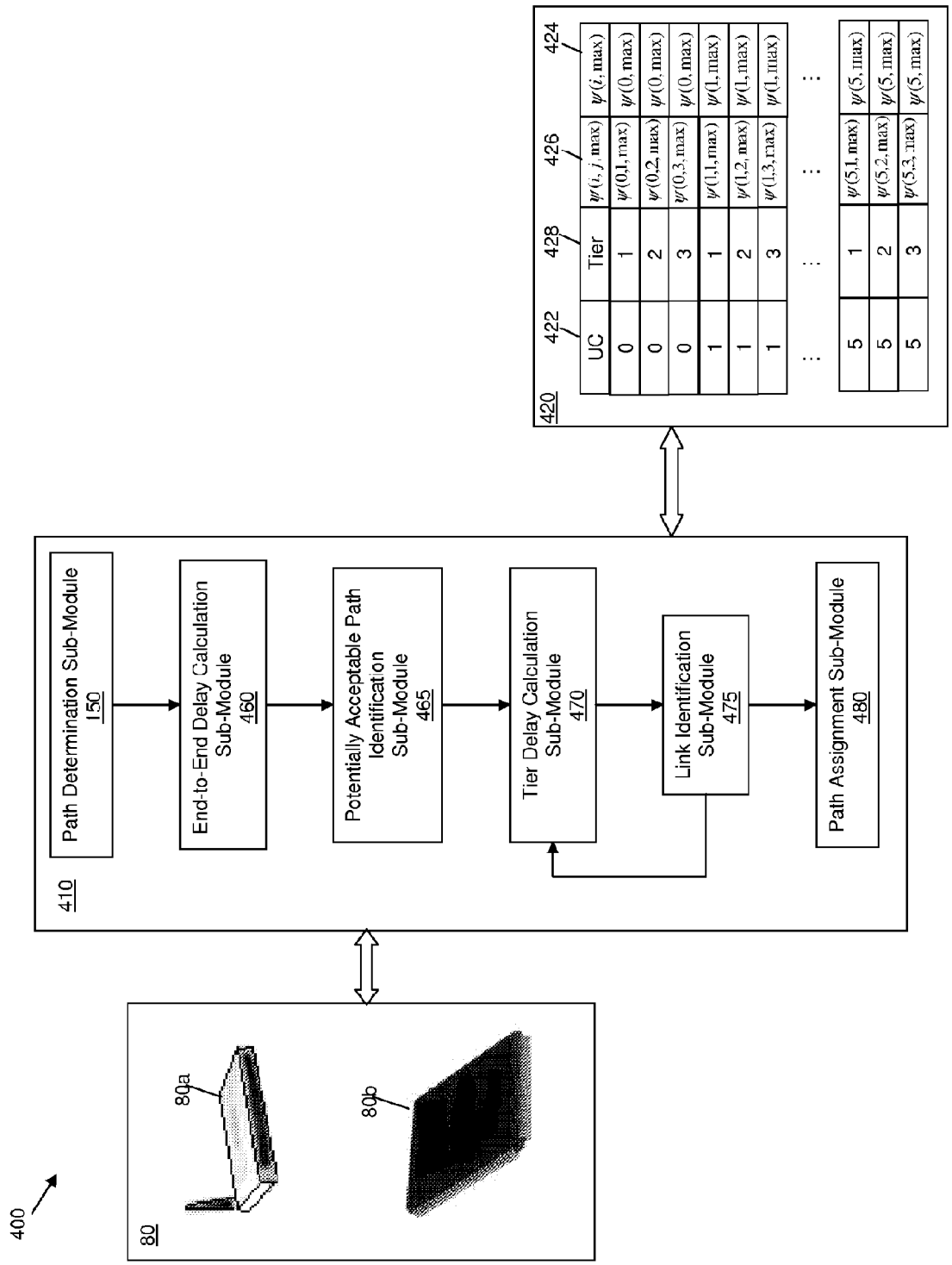
FIG. 11 is a schematic block diagram including a delay minimization module in accordance with an embodiment of the present invention.

FIG. 11 is a schematic block diagram of a wireless process control and/or automation network routing system 400 according to still another embodiment of the present invention. In general, the wireless process control and/or automation network routing system 400 includes a delay minimization module 410, a set of maximum allowable delay rules 420, e.g., in the form of a maximum allowable delay table incorporating maximum allowable tier delay values 426 for tiers j 428 in a given usage class i 422 and maximum allowable end-to-end delay values 424 for a given usage class i 422, and hardware 80 for executing the delay minimization module 410. In general, the delay minimization module 410 is executable by suitably interconnected hardware 80, such as one or more wireless gateway devices 80a, a separate computing device 80b, a combination of one or more wireless gateway devices 80a and a separate computing device 80b, or other known processing device. The tier delay minimization module 410 generally includes a path determination sub-module 150, an end-to-end delay calculation sub-module 460, a potentially acceptable path identification sub-module 465, a tier delay calculation sub-module 470, a link identification sub-module 475 and a path assignment sub-module 480.

Figure 12:
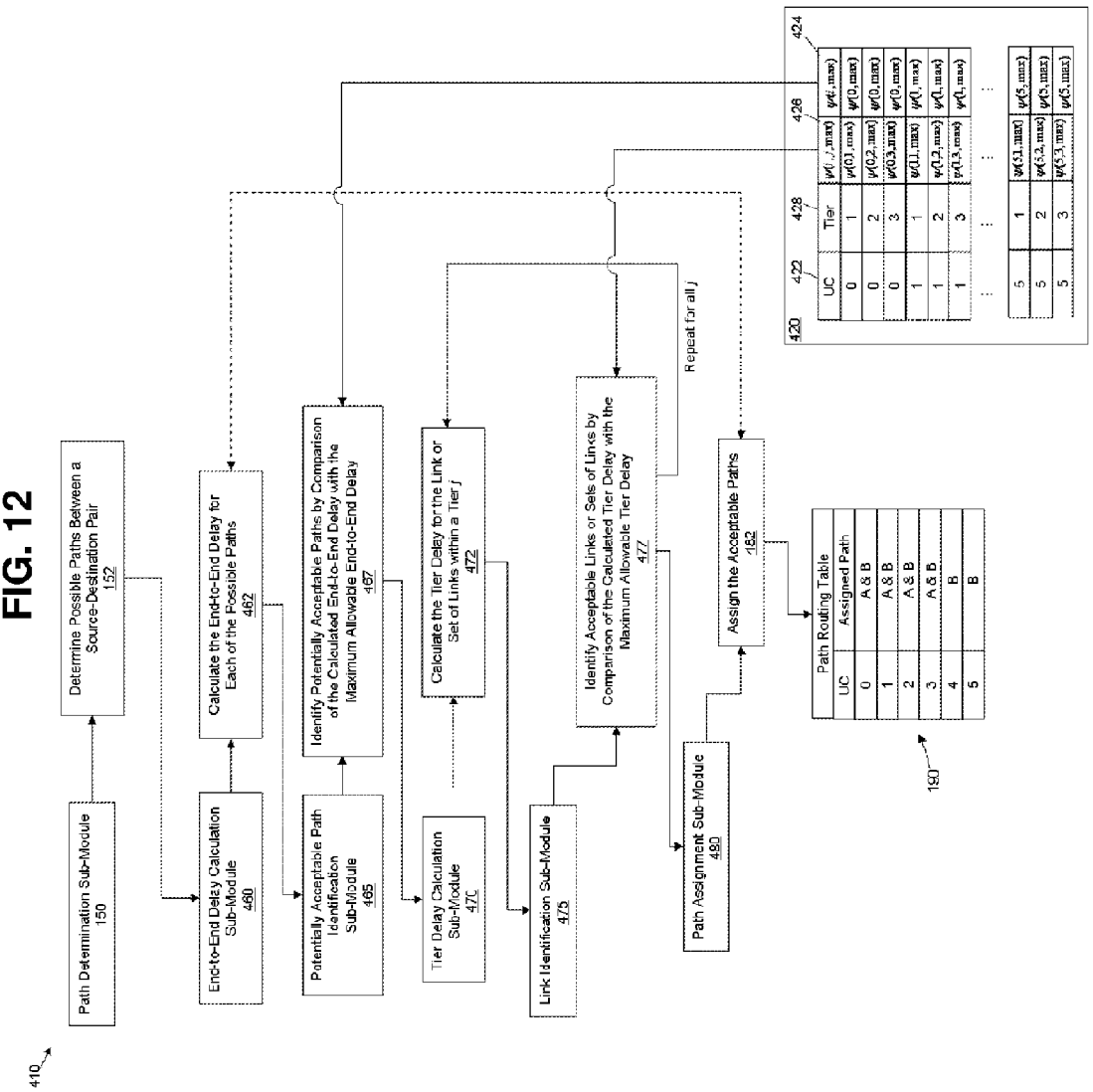
FIG. 12 is a flow chart of a method of assigning paths operating the delay minimization module in accordance with the present invention.

Still referring to FIG. 11, and also referring to FIG. 12, the operation of an embodiment of the delay minimization module 410 is shown in more detail. While the steps of incorporating network statistics, and determining and employing the additional factors including reliability, throughput and total number of hops for the assignment of paths, are not specifically shown with respect to FIG. 12 for sake of clarity, one of skill in the art will appreciate based on the previous embodiments described herein that these additional steps can be incorporated in the module 410.

As shown in FIG. 12, a path determination sub-module 150 determines at step 152 possible paths between a selected source-destination pair. This step 152 and module 150 operate, for instance, in the same manner as described above with respect to FIGS. 5 and 6.

Next, the end-to-end delay calculation sub-module 460 calculates at step 462 the end-to-end delay for each of the possible paths determined in step 152. These calculations can be based upon network statistics (not shown in FIG. 12), for instance, as discussed with respect to FIG. 8 (reference numeral 264). For instance, each transmitted frame includes a timestamp with the time at which frame processing commences at the source. When the frame is received by the destination, a receipt timestamp is incorporated, and the end-to-end delay can be calculated. This calculation accounts for all frame or packet processing time and transmission time at each node in the path.

In certain embodiments, for instance, as depicted in FIG. 8 (reference numeral 263), in addition to calculating the end-to-end delay of each of the possible paths at step 462, sub-module 460 or another sub-module performs an optional step in which the reliability, throughput, number of hops, or a combination of one or more of reliability, throughput and number of hops for each of the possible paths is determined or calculated. This determination or calculation can be used in identification of potentially acceptable paths as described below with respect to sub-module 465 and step 467 to designate one or more paths that meet multiple constraints.

Next, at step 467, the potentially acceptable path identification sub-module 465 identifies potentially acceptable paths by comparison of the calculated end-to-end delay determined at step 462 with the maximum allowable end-to-end delay specified in the set of delay rules 420 (column 424). The set of delay rules 420 includes, in certain embodiments, specified maximum allowable end-to-end delay 424 per usage class 422, denoted as ψ(i, max). Paths are identified as potentially acceptable if Equation (9b) set forth above is satisfied.

In the method of the module 410, even though certain paths can be identified as potentially acceptable at step 467, these potentially acceptable paths will not be assigned to the routing table 190 if any one of the tier delays exceeds the maximum allowable tier delay ψ(j, i, max). Therefore, the tier delay calculation sub-module 470 and link identification sub-module 475 are incorporated to ensure that the delay at each tier meets the constraints. In particular, the tier delay calculation sub-module 470 calculates at step 472 the tier delay for each of the links or set of links in tier j for the possible paths determined in step 152. These calculations can be based upon network statistics, for instance, as described with respect to FIG. 10 (reference numeral 364). For example, each transmitted frame includes a timestamp with the time at which frame processing commences at the source; when the frame is transmitted from the last node in the given tier, a transmission timestamp is incorporated, and the tier delay can be calculated based on all frame or packet processing time and transmission time at each node in the path in tier j.

In certain embodiments, in addition to calculating the tier delay of each of the possible paths at step 472, sub-module 470 or another sub-module performs an optional step in which the reliability, throughput, number of hops, or a combination of one or more of reliability, throughput and number of hops for each of the possible paths is determined or calculated, as described with respect to FIG. 10 (reference numeral 363).

Next, at step 477, the link identification sub-module 475 identifies acceptable links or sets of links by comparison of the calculated tier delay with the maximum allowable tier delay specified in the set of maximum allowable tier delay rules 420. A link or a set of links is identified as acceptable if Equation (9a) set forth above is satisfied. The steps 472 and 477 are repeated for each tier j within a path, or unless a calculated tier delay exceeds the maximum allowable tier delay, at which point the path is discarded.

Finally, after Equation (9a) is satisfied for all tiers within a given path, the path assignment sub-module 480 assigns at step 482 the acceptable paths to the routing table 190. In additional embodiments of the present invention, at step 482, the path assignment sub-module 480 also considers additional constraints in assigning paths to the path routing table 190, including reliability (e.g., following the module 110 described with respect to FIGS. 5 and 6), throughput, number of hops, or a combination of one or more of reliability, throughput and number of hops, as indicated by step 383 in FIG. 10.

In addition, in still further embodiments of the present invention, the path assignment step 482 is iterative, wherein, based upon network statistics related to one or more of determined reliability, calculated throughput, number of hops and calculated tier delay, certain paths are discarded and replaced with additional paths. The iterative nature of the delay module 410 allows the system and method to be adaptive to continuously maintain optimal network traffic flow, and is comprehended in FIG. 12 with a dashed connector between steps 462 and 482.

In additional embodiments as discussed above, the maximum allowable throughput for a given link η(L(x, y), max) is considered in the selection of the minimum number of independent paths $N_i^{opt}$ and/or the assignment of particular paths for a source-destination pair such that the following condition is satisfied:

$$\eta(L(x,y)) \leq \eta(L(x,y), \text{max}) \text{ for all } y \qquad (10).$$

In the event that the minimum number of independent paths $N_i^{opt}$ or the combination of the minimum number of independent paths $N_i^{opt}$ and the allowed number of alternative paths cannot be assigned, one or more of the following can be implemented until the constraints are met: (1) add another path, e.g., a set of WED, WID, and/or WGD, to boost reliability, throughput or minimize delay; (2) improve the reliability of the weakest link through redundancy; and/or (3) use other RF channels and/or hopping patterns.

In still further embodiments of the present invention, based on the traffic distribution and throughput, the number of channels per selected paths is determined to ensure that the maximum allowable tier delay ψ(i, j, max) and η(L(x, y), max) are both satisfied. Paths with ψ(i, j, x) that exceed the maximum allowable tier delay ψ(i, j, max) or the end-to-end ψ(i, max) will either (1) be replaced with other paths, or (2) amended with multiple channels per path, in order to meet process control system usage class requirements.

In accordance with conventional data frame architecture that is well known to those skilled in the art, each frame is supplied with a digit indicating whether it is an original transmission or a retransmitted frame. In accordance with certain embodiments of the present invention, the conventional data frame architecture is modified to reflecting its usage class level. A usage class digit (UCD) is added in the routing table for each source-destination pair to be utilized during the routing of a frame. This UCD is utilized in data frame transmission so that frames are dropped if the frame usage class is greater than the UCD. That is, the system will route a frame only when the frame usage class is less than or equal to the UCD. In certain embodiments, for retransmitted frames, the process will allow passing the retried frames through the assigned and alternate paths irrespective of the UCD.

Table 3 below is a partial representation of a routing table between certain pairs of WIDs and WGDs that includes an indication of a UCD for the depicted pairs. Note that the pairs can be direct links or links with intermediate hops. For example, path 1 is a path between source address 4E22 and destination address 22A4, and is an assigned path for frames with a UCD of 3, whereby an initially transmitted frame with usage class 0, 1, 2 or 3 will be passed, but an initially transmitted frame with a usage class of 4 or 5 will not be passed. Path 2 is an alternative path between the same source-destination pair with a UCD of 5 or lower, whereby retransmitted frames of all classes will be passed through the path. Path 3 is an alternate path between the 4B78 and 22A4 source-destination address pair for all usage classes, i.e., all retransmitted frames will pass. Path 4 is an assigned path between 4E22 and 22D9 for all usage classes. Path 5 is an alternate path between 4EAA and 22D9 for class 0, 1 and 2 only.

TABLE 3

(Part of the) Routing table

| Path | Source Address WID | Dest. Address WGD | UCD | Path Type |
|---|---|---|---|---|
| 1 | 4E22 | 22A4 | 3 | AS |
| 2 | 4E22 | 22A4 | 5 | AL |
| 3 | 4B78 | 22A4 | 5 | AL |
| 4 | 4E22 | 22D9 | 5 | AS |
| 5 | 4EAA | 22D9 | 2 | AL |

AS = Assigned Path
AL = Alternate Path

The method and system of the present invention includes dynamic adjustment of routing to allow assigned and alternative paths to pass traffic irrespective of the usage class when either of the following events occur: (a) when a timeout occurs, either due to a violation of the maximum allowable delay (tier and/or end-to-end) or because an acknowledge message is not received, the assigned and alternate paths for the source-destination pair (where the timeout occurs) will allow all frames to pass irrespective of the usage class; (b) when the frame error probability for a link within an assigned path exceeds a specified threshold, all source-destination pairs with an assigned path through this link allows the assigned and alternate paths to pass all traffic. A message for adjustment of the routing table 190 for WGDs and WIDs can be initiated by the master WGD and/or the device that executed the route optimization module 110. The adjustment of the routing table can be effective for a preset time duration, or until a second message is received requesting reversion to normal routing settings.

In additional embodiments of the present invention, a combination of the above-described constraints is implemented to optimize and select routes for a wireless process control and/or automation network. For each particular pair of source and destination, N, is minimized such that Equation (8) is satisfied for all i, with the additional conditions that Equations (2), (6), (9a) and (10) are satisfied. If any of Equations (8), (2), (6), (9a) and (10) are not satisfied, than:

a. another path, i.e., a set of WED, WID and WGD, can be added to boost reliability, throughput or minimize delay;
b. the reliability of the weakest link can be improved through redundancy;
c. other radio frequency channels and/or hopping patterns can be used; or
d. any combination of (a), (b) and (c) can be implemented.

The process is repeated for each source-destination pair in the wireless process control and/or automation network, or each source-destination pair in the wireless process control and/or automation network for which optimization according to the present invention is desired.

The above route optimization module described with respect to FIGS. 5 and 6, optionally including the additional steps or sub-modules, can be implemented with respect to the entire network or certain source-destination pairs. In embodiments in which the path optimization process is implemented for the entire network, the above process, optionally including the additional steps or embodiments, is repeated for each source-destination pair in the system. In embodiments in which the path optimization process is implemented for certain selected source-destination pairs, the above process, optionally including the additional steps or embodiments, is repeated for the source-destination pairs to be optimized. To prevent channel congestion with respect to pairs that are not optimized, routing rules can be implemented that prioritize the selected source-destination pairs through the assigned paths, or through the assigned paths and alternate paths in embodiments in which alternate paths are provided. In further embodiments, the assigned paths, or the assigned paths and alternate paths in embodiments in which alternate paths are provided, can be reserved exclusively for the source-destination pairs selected for optimization according to the method and system of the present invention.

Illustrative Example

Figure 13:
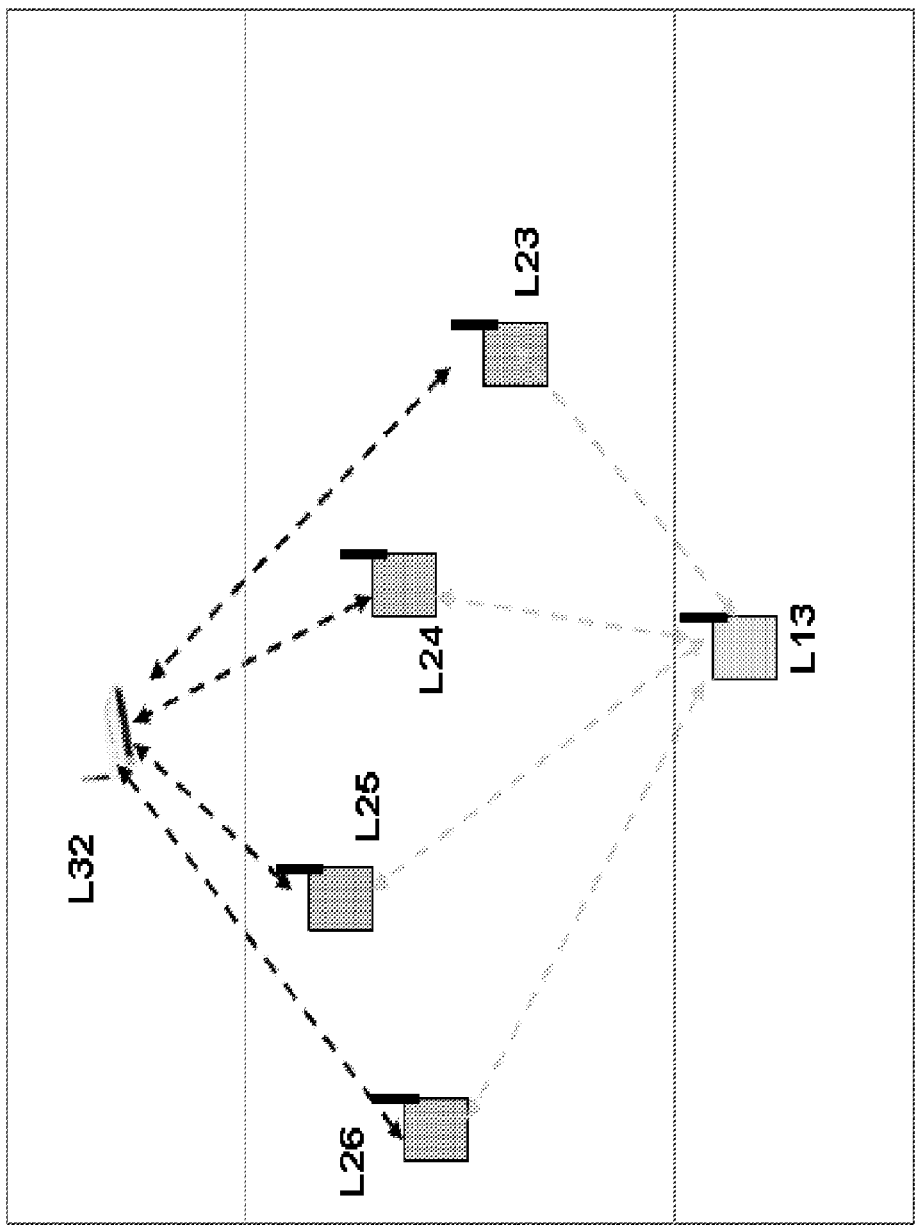
FIG. 13 is a schematic diagram of a portion of a wireless process control and/or automation network architecture depicting a set of source-destination pair components.

For the purpose of demonstrating a wireless process control system using the optimization process and system of the present invention, reference is made to the portion of an ISA-SP100 network shown in FIG. 13. The portion depicted includes a single source-destination pair with multiple paths. Each wireless link has a maximum capacity of 250 kbps, and an effective achievable throughput of 100 kbps, since the maximum achievable throughput is typically in the range of 40% of link capacity for CSMA-CA protocols and the like. The links' frame error rate profiles are given in Table 4, which also provides the existing levels of throughput per link. The process control equipment at WID L13 is assumed to generate 60 kbps when commissioned to the network, where 40 kbps is the traffic going to the CCR (uplink) and 20 kbps is the traffic coming from the CCR to L13 (downlink).

Frame retransmission rates are assumed to be below 1% for all classes of service. It should be noted that these FER values will depend on the specifics of the underlying physical layer, e.g., type of digital modulation and error control coding, radio channel path loss and fading, co-channel interference, etc. For illustration, typical FER values are assumed.

In Table 5, the required FERs per class are listed, and a typical traffic mix across the different classes of service is represented by the percentage of frames belonging to Class 0, 1, 2, 3, 4 and 5. In addition, assumed limits for total end-to-end delay and per-tier delay are specified. In general, delay values will be related to the traffic loading and queuing/priority mechanisms. Actual delay values per link can be obtained empirically from message timestamps. Depending on the number of hops that a given frame has to make, the accrued delay can be computed, which are accounted for in the optimization system and method of the present invention to provide a certain end-to-end delay.

TABLE 4

| Source | Destination | Link FER | $\eta(L(x, y))$ (kbps) |
|---|---|---|---|
| L13 | L23 | 1.00E−05 | 0 |
| L13 | L24 | 1.00E−06 | 0 |
| L13 | L25 | 5.00E−07 | 0 |
| L13 | L26 | 1.00E−07 | 0 |
| L23 | L32 | 5.00E−04 | 60 |
| L24 | L32 | 5.00E−06 | 30 |
| L25 | L32 | 5.00E−04 | 70 |
| L26 | L32 | 5.00E−03 | 90 |

TABLE 5

| Class | Maximum Allowable FER $\Phi_c(i)$ | Traffic Mix $D_i$ | End-to-End $\psi$ (i, max) | Tier 1 $\psi$ (i, 1, max) | Tier 2 $\psi$ (i, 2, max) | Tier 3 $\psi$ (i, 3, max) |
|---|---|---|---|---|---|---|
| 0 | 1.00E−08 | 0% | 0.3 sec | 0.1 sec | 0.1 sec | 0.1 sec |
| 1 | 1.00E−08 | 8% | 0.5 sec | 0.2 sec | 0.2 sec | 0.1 sec |
| 2 | 1.00E−07 | 10% | 0.5 sec | 0.2 sec | 0.2 sec | 0.1 sec |
| 3 | 1.00E−06 | 12% | 1 sec | 0.4 sec | 0.3 sec | 0.3 sec |
| 4 | 1.00E−05 | 35% | 5 sec | 2 sec | 2 sec | 1 sec |
| 5 | 1.00E−05 | 35% | 5 sec | 2 sec | 2 sec | 1 sec |

Applying the given data into the process simulation model, the paths' frame error probabilities are calculated as shown in Table 6. The frame error probabilities when transmitting frames over multiple independent paths are then calculated as in Table 7. Based on the optimized routing method and system of the present invention, the assigned and alternating paths are given in Table 8. For the purpose of the present example, no more than 2 paths are assigned.

Table 9 provides the resulting links' throughputs following the path assignment of Table 8. Since the throughput of L26-L32 exceeds 100 kbps, a second RF channel is provided to support this traffic.

TABLE 6

| Path | Path Designation | $\Phi(L(x, y))$ |
|---|---|---|
| L13-L23-L32 | A | 5.10E−04 |
| L13-L24-L32 | B | 6.00E−06 |
| L13-L25-L32 | C | 5.00E−04 |
| L13-L26-L32 | D | 5.00E−03 |

TABLE 7

Associated FER with Selected Paths

| x | $\Phi(x)$ | x | $\Phi(x)$ |
|---|---|---|---|
| A | 5.10E−04 | B & C | 3.00E−09 |
| B | 6.00E−06 | B & D | 3.00E−08 |
| C | 5.00E−04 | C & D | 2.50E−06 |
| D | 5.00E−03 | A & B & C | 1.53E−12 |
| A & B | 3.06E−09 | A & B & D | 1.53E−11 |
| A & C | 2.55E−07 | B & C & D | 1.50E−11 |
| A & D | 2.55E−06 | A & B & C & D | 7.66E−15 |

TABLE 8

| Class | Assigned path | Alternate path |
|---|---|---|
| 0 | A & B | C & D |
| 1 | A & B | C & D |
| 2 | A & B | C & D |
| 3 | A & B | C & D |
| 4 | B | A & C |
| 5 | B | A & C |

TABLE 9

Link Throughput

| Source | Destination | Throughput (kbps) |
|---|---|---|
| L13 | L23 | 46 |
| L13 | L24 | 60 |
| L13 | L25 | 40 |
| L13 | L25 | 40 |
| L23 | L32 | 92 |
| L24 | L32 | 90 |
| L25 | L32 | 90 |
| L26 | L32 | 110 |

The "normalized" spectrum usage (counted per RF channel use) can be estimated by taking into account the total number of RF channel occupancies for the end-to-end connection. This can be calculated as follows:

$$U = \sum_i D_i N_i \qquad (11)$$

where $D_i$ represents the traffic distribution percentage for class i, and $N_i$ is the number RF channels occupied per class. This expression applies to the standard (i.e., non-optimized) operation procedure. However, with the optimization algorithm of this invention, the normalized spectrum usage becomes:

$$U = \sum_i D_i N_i^{opt} + P_{ret} \sum_i D_i (N_i^{opt} + 2) \qquad (12)$$

where $P_{ret}$ is the average retransmitted probability in the system. By applying these formulas for the specific parameters used in this example, under standard non-optimized operation the following result for spectrum utilization is attained:

$U = 1 + 4*(0\% + 8\% + 10\% + 12\% + 35\% + 35\%) = 5$, since there is one RF transmission from L13 to a WID, and four separate RF transmissions going from WID to WGD. On the other hand, the normalized spectrum usage is obtained as follows for the case of the process optimization of this invention:

$U = [1 + 2*(8\% + 10\% + 12\%) + 1*(35\% + 35\%)] + 0.01*4 [(8\% + 10\% + 12\%) + 3*(35\% + 35\%)] = 2.4$ where 1% retransmission probability is assumed.

The ratio of 5/2.4≅2 indicates that double the spectrum would be required if the process optimization of this invention is not followed. Notably, these savings in spectrum consumption do not preclude meeting the minimum usage class requirements.

Figure 14:
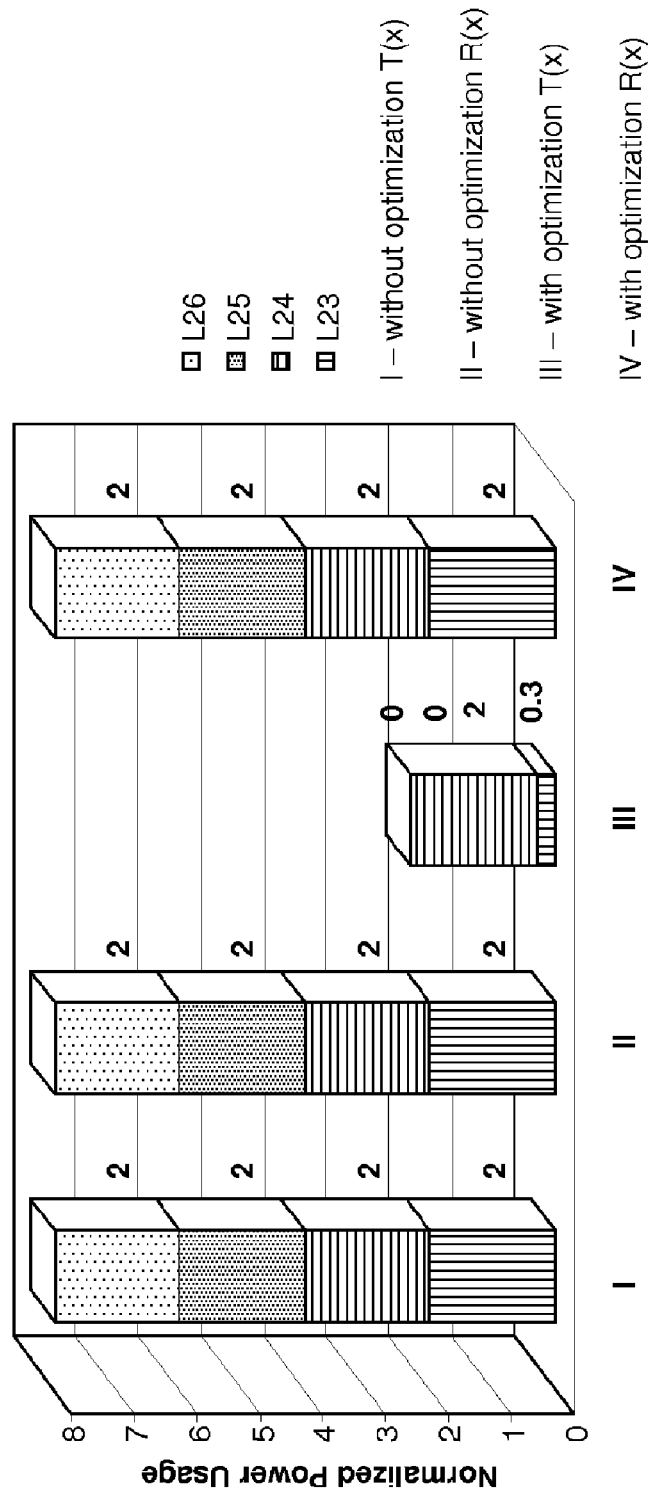
FIG. 14 is a chart of normalized power usage comparison for wireless intermediate devices using the system and method of the present invention compared to prior art methods.
Figure 15:
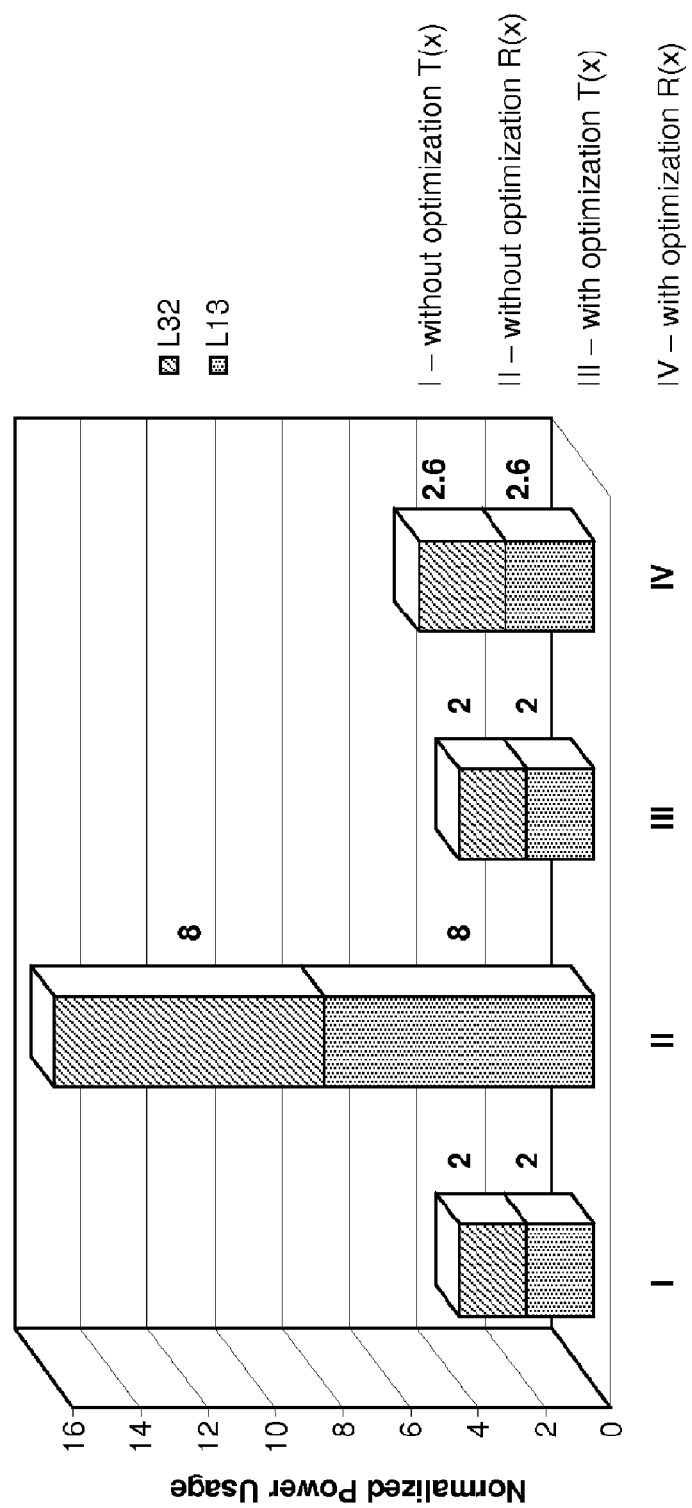
FIG. 15 is a chart of normalized power usage comparison for wireless end devices and wireless gateway devices using the system and method of the present invention compared to methods of the prior art.

This optimization procedure can also significantly reduce power consumption for the nodes. Battery power usage is directly proportional to the number of transmitted and received frames, and is not significantly impacted by other processing activities such as encryption, authentication, heartbeat signal, and the like. FIGS. 14 and 15 show the normalized power usage (which is proportional to the number of frames transmitted and received) from L13 to L32, with and without the optimization scheme. Note that for the purpose of FIGS. 8 and 9, a single transmission consists of a frame sent from L13 to L32 and the acknowledgement frames sent from L32 to L13.

FIG. 14 indicates that the number of received frames for the four WIDs remains the same with and without the optimization scheme, whereas the number of transmitted frames drops from 8 to 2.3 frames when the optimization scheme is implemented. FIG. 15 reveals that the number of frames received by the WED and WGD drop from 8 to 2.6 for a single transmission, while the number of transmitted frames remain unchanged. Thus, the implementation of the optimization scheme extends battery lifecycle by 55% (16/10.3) for WIDs, and by 117% (10/4.6) for WEDs.

The method and system of the present invention have been described above and in the attached drawings; however, modifications will be apparent to those of ordinary skill in the art and the scope of protection for the invention is to be defined by the claims that follow. In addition, while certain implementations of the present invention have been described with respect to the ISA-SP100 protocol, the present invention can also be implemented within other wireless process control and/or automation protocols including but not limited to the HART® protocol.

We claim:

1. A method of selecting paths in a wireless process control and/or automation network, the wireless process control and/or automation network including
a tier of one or more wireless end devices for transmitting data and/or receiving data, and
either
   a tier of one or more wireless intermediate devices for transmitting data and/or receiving data and routing received data and a tier of one or more wireless gateway devices for assigning data paths, transmitting data, receiving data and routing received data, or
   a tier of or one or more wireless intermediate devices or a tier of one or more wireless gateway devices,
wherein a source-destination pair includes links between the one or more wireless end devices, and the one or more wireless intermediate devices and/or the one or more wireless gateway devices,
the method of selecting paths comprising:
a. determining possible paths between a selected source-destination pair;
b. identifying one or more reliable paths, or one or more reliable groups of paths, by comparing the reliability of each of the possible paths or groups of possible paths with a specified minimum reliability requirement;
c. identifying a potentially acceptable path by comparison of a calculated end-to-end delay for the one of the possible paths with a maximum allowable end-to-end delay, wherein a path is deemed potentially acceptable if the calculated end-to-end delay is equal to or less than the maximum allowable end-to-end delay;
d. identifying an acceptable link or set of links by comparison of a calculated tier delay for a selected link or set of links with a maximum allowable tier delay for a selected tier, wherein a link or set of links is deemed acceptable if the calculated tier delay is equal to or less than the maximum allowable tier delay for that one of the tiers; and
e. assigning the potentially acceptable path for the selected source-destination pair to a routing table if all of the links or sets of links within the one of the possible paths are identified as acceptable in step (d) and if the potentially acceptable path is identified as reliable in step (b).

2. A method of selecting paths in a wireless process control and/or automation network, the wireless process control and/or automation network including
one or more wireless end devices for transmitting data and/or receiving data, and either
   one or more wireless intermediate devices for transmitting data and/or receiving data and routing received data and one or more wireless gateway devices for assigning data paths, transmitting data, receiving data and routing received data, or
   one or more wireless intermediate devices or
   one or more wireless gateway devices,
wherein a source-destination pair includes links between the one or more wireless end devices, and the one or more wireless intermediate devices and/or the one or more wireless gateway devices,
the method of selecting paths comprising:
a. specifying a minimum reliability requirement for a selected source-destination pair;
b. specifying a minimum number of paths between the selected source-destination pair;
c. determining possible paths between the selected source-destination pair;
d. calculating the reliability of each of the possible paths, or an effective reliability of one or more groups of possible paths;
e. identifying one or more reliable paths, or one or more reliable groups of paths, by comparing the reliability of each of the possible paths or groups of possible paths with the specified minimum reliability requirements; and
f. assigning the minimum number of paths for the selected source-destination pair to a routing table from the identified reliable paths or the identified reliable group of paths, and discarding, or assigning as alternate paths to the routing table, identified reliable paths or identified reliable groups of paths that exceed the minimum number of paths.

3. The method of claim 2, wherein:
step (a) specifies minimum reliability requirements for a plurality of selected source-destination pairs;
step (b) specifies a minimum number of paths for the plurality of selected source-destination pairs;
step (c) determines possible paths for each of the plurality of selected source-destination pairs;
step (d) calculates the reliability for each of the possible paths or a group of paths between the plurality of selected source-destination pairs;
step (e) identifies reliable paths or a group of paths for the plurality of selected source-destination pairs; and
step (f) assigns the minimum number of paths for each of the plurality of selected source-destination pairs.

4. The method of claim 2, wherein a plurality of usage classes are defined for wireless communication, step (a) specifies a set of minimum reliability requirements for each usage class, and step (b) specified a minimum number of paths for each usage class.

5. The method as in claim 4, further comprising specifying a maximum allowable delay for each usage class, and, prior to assigning in step (f), discarding any paths that exceed the maximum allowable delay for the usage class even if the determined reliability of those paths meets the specified minimum reliability requirements as determined in step (e).

6. The method as in claim 5, wherein the maximum allowable delay for each usage class is represented as $\psi(j, i, \max)$ where j denotes a tier of wireless end devices, wireless intermediate devices or wireless gateway devices, and i denotes a usage class, and the calculated delay in tier j for a usage class i going through path x is represented as $\psi(j, i, x)$, and, prior to step (f), discarding paths that do not meet the condition $\psi(j, i, x) \leq \psi(j, i, \max)$ for all j and i in a path x even if the determined reliability of those paths meets the specified minimum reliability requirements as determined in step (e).

7. The method as in claim 5, wherein the maximum allowable delay for each usage class i is represented as $\psi(i, \max)$ and the delay for a path x in a usage class i is represented as $\psi(i, x)$, and, prior to assigning in step (f), discarding paths that do not meet the condition $\psi(i, x) \leq \psi(i, \max)$ for all i and x even if the determined reliability of those paths meets the specified minimum reliability requirements as determined in step (e).

8. The method of claim 4, further comprising adding a usage class digit to the routing table for the source-destination pair to be utilized during the routing of a frame, whereby a frame is dropped if the usage class of the frame is greater than the usage class digit.

9. The method of claim 4, wherein routing is dynamically adjusted to allow assigned and alternative paths to pass a data frame irrespective of the usage class when a timeout occurs for that data frame.

10. The method of claim 4, wherein routing is dynamically adjusted to allow assigned and alternative paths to pass a data frame irrespective of the usage class when the data frame is identified as a retransmitted data frame.

11. The method of claim 4, wherein routing is dynamically adjusted to allow assigned and alternative paths to pass traffic irrespective of the usage class when the frame error probability for a link within an assigned path exceeds a specified threshold.

12. The method of claim 4, wherein, during abnormal channel conditions, sending a control message to wireless intermediate devices and/or wireless gateway devices to route frames irrespective of the usage class.

13. The method of claim 2, further comprising, if the minimum number of paths is not met in step (f),
 i. adding additional paths or groups of paths to the routing table to boost reliability, throughput or minimize delay;
 ii. improve the reliability of the weakest link through redundancy; and/or
 iii. use other radio frequency channels and/or hopping patterns.

14. The method of claim 2, wherein the reliability for a source-destination path x in step (d) is represented as $1-\Phi(x)$, wherein $\Phi(x)$ is the frame error rate for a source-destination path x.

15. The method of claim 14, wherein the reliability $1-\Phi(x)$ is based on the frame error rate of each link, represented as $\Phi(L(x, y))$.

16. The method of claim 15, wherein the reliability $1-\Phi(x)$ is determined using the equation $$1 - \Phi(x) = \prod_{y=1}^{|L(x)|} (1 - \Phi(L(x, y)))$$

for each path x of the selected source-destination pair,
 wherein y is the link and $|L(x)|$ is the number of intermediate links for the path x.

17. The method of claim 16, further comprising in step (d) comparing the frame error rate of each link $\Phi(L(x, y))$ with a maximum allowable frame error probability $\alpha$ for each link y, and discarding any paths x containing the link y if $\Phi(L(x, y)) \leq \alpha$ is not satisfied for the link y.

18. The method of claim 14, wherein a reliability of two independent paths $x_1$ and $x_2$ combined is expressed as $1-\Phi(x_1, x_2) = 1-\Phi(x_1)*\Phi(x_2)$ and the reliability $1-\Phi(x_1, x_2)$ is used in the comparison of step (e).

19. The method of claim 14, wherein reliability of $N_P$ independent paths is expressed as $$1 - \Phi(x_1, x_2, \ldots, x_{N_P}) = 1 - \prod_{w=1}^{N_P} (\Phi(x_w)),$$

further wherein the reliability $1-\Phi(x_1, x_2, \ldots, x_{N_P})$ is used in the comparison of step (e).

20. The method of claim 2, further comprising specifying a number of alternate paths, and assigning the specified number of alternate paths for the source-destination pair to the routing table, wherein frames are routed through the specified number of alternate paths and the assigned minimum number of paths from step (f) only if degradation in performance is sensed in any of the links or devices in the source-destination path.

21. The method of claim 2, further comprising specifying a maximum allowable delay for a source-destination pair, and, prior to assigning in step (f), discarding any paths that exceed the maximum allowable delay even if the determined reliability of those paths meets the specified minimum reliability requirements as determined in step (e).

22. The method of claim 2, further comprising specifying a maximum allowable throughput for a link represented as $\eta(L(x, y), \max)$, prior to step (f), discarding paths that do not meet the condition $\eta(L(x, y)) \leq \eta(L(x, y), \max)$ for all links y, where $\eta L((x, y))$ represents the throughput for the y-th link of the x-th path, even if the determined reliability of those paths meets the specified minimum reliability requirements as determined in step (e).

23. The method of claim 2, which includes optimizing routes for a group of less than all selected source-destination pairs, and prioritizing the group of selected source-destination pairs through the assigned minimum number of paths.

24. The method of claim 2, which includes optimizing the routes for a group of less than all selected source-destination pairs, and reserving the assigned minimum number of paths exclusively for the group of selected source-destination pairs.

25. A method of selecting paths in a wireless process control and/or automation network, the wireless process control and/or automation network including
 one or more wireless end devices for transmitting data and/or receiving data, and either
 one or more wireless intermediate devices for transmitting data and/or receiving data and routing received data and one or more wireless gateway devices for assigning data paths, transmitting data, receiving data and routing received data, or one or more wireless intermediate devices or one or more wireless gateway devices, wherein a source-destination pair includes links between the one or more wireless end devices, and the one or more wireless intermediate devices and/or the one or more wireless gateway devices, the method of selecting paths comprising:

a. designating a maximum allowable end-to-end delay for a selected source-destination pair;

b. determining possible paths between the selected source-destination pair;

c. calculating an end-to-end delay for one of the possible paths;

d. identifying an acceptable path by comparing the calculated end-to-end delay for the one of the possible paths with the maximum allowable end-to-end delay, wherein a path is deemed acceptable if the calculated end-to-end delay is equal to or less than the maximum allowable end-to-end delay;

e. assigning the acceptable path to a routing table; and f. repeating steps (c)-(e) for each of the possible paths identified in step (b).

26. The method of claim 25, wherein at step (a), a minimum reliability requirement and a minimum number of paths is specified for the selected source-destination pair, the method further comprising, calculating the reliability of each of the acceptable paths or a group of acceptable paths;

identifying one or more reliable paths, or a group of paths, by comparing the reliability of each of the acceptable paths or a group of acceptable paths with the specified minimum reliability requirements; and assigning the minimum number of, paths for the selected source-destination pair to a routing table from the identified reliable paths or a group of paths.

27. The method of claim 25, further comprising specifying a number of alternate paths, and assigning the specified number of alternate paths for the source-destination pair to the routing table, wherein frames are routed through the specified number of alternate paths and the assigned minimum number of paths only if degradation in performance is sensed in any of the links or devices in the source-destination path.

28. The method of claim 25, further comprising specifying a maximum allowable throughput for a link represented as $\eta(L(x, y), max)$, discarding paths that do not meet the condition $\eta(L(x, y)) \leq \eta(L(x, y), max)$ for all links y, where $\eta(L(x, y))$ represents the throughput for the y-th link of the x-th path.

29. The method of claim 25, wherein a plurality of usage classes are provided for wireless communication, and step (a) designates a maximum allowable end-to-end delay for each usage class for the selected source-destination pair.

30. The method of claim 29, wherein, during abnormal channel conditions, sending a control message to wireless intermediate devices and/or wireless gateway devices to route frames irrespective of the usage class.

31. A method of selecting paths in a wireless process control and/or automation network, the wireless process control and/or automation network including a tier of one or more wireless end devices for transmitting data and/or receiving data, and either a tier of one or more wireless intermediate devices for transmitting data and/or receiving data and routing received data and a tier of one or more wireless gateway devices for assigning data paths, transmitting data, receiving data and routing received data, or a tier of or one or more wireless intermediate devices or a tier of one or more wireless gateway devices, wherein a source-destination pair includes links between the one or more wireless end devices, and the one or more wireless intermediate devices and/or the one or more wireless gateway devices, the method of selecting paths comprising:

a. designating a maximum allowable tier delay for a selected source-destination pair and for each tier;

b. determining possible paths between the selected source-destination pair;

c. calculating a tier delay for a link or set of links within a selected one of the tiers for one of the possible paths;

d. identifying an acceptable link or set of links by comparison of the calculated tier delay for that link or set of links with the maximum allowable tier delay for the selected tier, wherein a link or set of links is deemed acceptable if the calculated tier delay is equal to or less than the maximum allowable tier delay for the selected tier;

e. repeating steps (c) and (d) for each tier of the one of the possible paths for the remaining tiers;

f. assigning the one of the possible paths for the selected source-destination pair to a routing table if all of the links or sets of links within the one of the possible paths are identified as acceptable; and g. repeating steps (c)-(f) for each of the possible paths identified in step (b).

32. The method of claim 31, wherein at step (a), a minimum reliability requirement and a minimum number of paths is specified for the selected source-destination pair, the method further comprising:

calculating the reliability of each of the acceptable paths or a group of acceptable paths;

identifying one or more reliable paths, or a group of paths, by comparing the reliability of each of the acceptable paths or a group of acceptable paths with the specified minimum reliability requirements; and assigning the minimum number of paths for the selected source-destination pair to a routing table from the identified reliable paths or a group of paths.

33. The method of claim 32, further comprising specifying a number of alternate paths, and assigning the specified number of alternate paths for the source-destination pair to the routing table, wherein frames are routed through the specified number of alternate paths and the assigned minimum number of paths only if degradation in performance is sensed in any of the links or devices in the source-destination path.

34. The method of claim 31, further comprising specifying a maximum allowable throughput for a link represented as $\eta(L(x, y), max)$, discarding paths that do not meet the condition $\eta(L(x, y)) \leq \eta(L(x, y), max)$ for all links y, where $\eta(L(x, y))$ represents the throughput for the y-th link of the x-th path.

35. The method of claim 31, wherein a plurality of usage classes are defined for wireless communication, and step (a) designates a maximum allowable tier delay for each usage class for the selected source-destination pair.

36. The method of claim 35, wherein, during abnormal channel conditions, sending a control message to wireless intermediate devices and/or wireless gateway devices to route frames irrespective of the usage class.

37. A method of selecting paths in a wireless process control and/or automation network, the wireless process control and/or automation network including a tier of one or more wireless end devices for transmitting data and/or receiving data, and either
  a tier of one or more wireless intermediate devices for transmitting data and/or receiving data and routing received data and a tier of one or more wireless gateway devices for assigning data paths, transmitting data, receiving data and routing received data, or
  a tier of or one or more wireless intermediate devices or a tier of one or more wireless gateway devices,
wherein a source-destination pair includes links between the one or more wireless end devices, and the one or more wireless intermediate devices and/or the one or more wireless gateway devices,
the method of selecting paths comprising:
a. designating a maximum allowable end-to-end delay and a maximum allowable tier delay for a selected source-destination pair and for each tier for a selected source-destination pair;
b. determining possible paths between the selected source-destination pair;
c. calculating an end-to-end delay for one of the possible paths;
d. identifying a potentially acceptable path by comparison of the calculated end-to-end delay for the one of the possible paths with the maximum allowable tier delay, wherein a path is deemed potentially acceptable if the calculated end-to-end delay is equal to or less than the maximum allowable end-to-end delay;
e. calculating a tier delay for a link or set of links within one of the tiers in the potentially acceptable path;
f. identifying an acceptable link or set of links within that one of the tiers by comparison of the calculated tier delay for that link or set of links with the maximum allowable tier delay for that one of the tiers, wherein a link or set of links is deemed acceptable if the calculated tier delay is equal to or less than the maximum allowable tier delay for that one of the tiers;
g. repeating steps (e) and (f) for a link or set of links within each tier of the potentially acceptable path;
h. assigning the potentially acceptable path for the selected source-destination pair to a routing table if all of the links or sets of links within the one of the possible paths are identified as acceptable; and
i. repeating steps (c)-(h) for each of the possible paths identified in step (b).

38. The method of claim 37, wherein at step (a), a minimum reliability requirement and a minimum number of paths is specified for the selected source-destination pair, the method further comprising,
  calculating the reliability of each of the acceptable paths or a group of acceptable paths;
  identifying one or more reliable paths, or a group of paths, by comparing the reliability of each of the acceptable paths or a group of acceptable paths with the specified minimum reliability requirements; and
  assigning the minimum number of paths for the selected source-destination pair to a routing table from the identified reliable paths or a group of paths.

39. The method of claim 38, further comprising specifying a number of alternate paths, and assigning the specified number of alternate paths for the source-destination pair to the routing table, wherein frames are routed through the specified number of alternate paths and the assigned minimum number of paths only if degradation in performance is sensed in any of the links or devices in the source-destination path.

40. The method of claim 37, further comprising:
specifying a maximum allowable throughput for a link represented as $\eta(L(x, y), max)$,
discarding paths that do not meet the condition $\Theta(L(x, y)) \leq \eta(L(x, y), max)$ for all links y, where $\eta(L(x, y))$ represents the throughput for the y-th link of the x-th path.

41. The method of claim 37, wherein a plurality of usage classes are provided for wireless communication, and step (a) designates a maximum allowable end-to-end delay and a maximum allowable tier delay for each usage class for the selected source-destination pair.

42. The method of claim 41, wherein, during abnormal channel conditions, sending a control message to wireless intermediate devices and/or wireless gateway devices to route frames irrespective of the usage class.

43. A communication path optimization system for controlling a wireless process control and/or automation network, the wireless process control and/or automation network including
  a tier of one or more wireless end devices for transmitting data and/or receiving data, and either
    a tier of one or more wireless intermediate devices for transmitting data and/or receiving data and routing received data, and a tier of one or more wireless gateway devices for assigning data paths, transmitting data, receiving data and routing received data, or
    a tier of one or more wireless intermediate devices or a tier of one or more wireless gateway devices,
  wherein at least one source-destination pair includes links between the one or more wireless end devices, and the one or more wireless intermediate devices and/or the one or more wireless gateway devices,
  the communication path optimization system comprising:
  a memory that stores
    a set of routing rules specifying a minimum reliability requirement for a selected source-destination pair and
    a specified minimum number of paths between the selected source-destination pair;
  a processor coupled to the memory; and
  a route optimization module executable by the processor and operable to transmit assigned reliable paths resulting from execution of the route optimization module to a routing table for instructing at least one of the one or more wireless gateway devices and/or the wireless intermediate devices, the route optimization module including:
    a path determination sub-module for determination of possible paths between the selected source-destination pair;
    a reliability calculation sub-module for calculation of the reliability of each of the possible paths, or an effective reliability of one or more groups of possible paths;
    a reliable path identification sub-module for identification of one or more reliable paths, or a one or more reliable groups of paths, by comparing the reliability of each of the possible paths or groups of possible paths with the specified minimum reliability requirements specified in the set of routing rules; and
    a path assignment sub-module for assignment of the minimum number of paths specified in the set of routing rules for the selected source-destination pair to the routing table from the identified reliable paths or the identified reliable groups of paths, and discarding, or assigning as alternate paths to the routing table, identified reliable paths or identified reliable groups of paths that exceed the minimum number of paths.

44. The communication path optimization system of claim 43, wherein the processor that executes the route optimization module resides in a wireless gateway device.

45. The communication path optimization system of claim 44, in which the wireless process control and/or automation network includes a plurality of wireless gateway devices, wherein the wireless gateway device that executes the route optimization module is a master wireless gateway device.

46. The communication path optimization system of claim 43, wherein the processor that executes the route optimization module resides in a computing device separate from a wireless gateway device.

47. A communication path optimization system for controlling a wireless process control and/or automation network, the wireless process control and/or automation network including
one or more wireless end devices for transmitting data and/or receiving data, and either
one or more wireless intermediate devices for transmitting data and/or receiving data and routing received data and one or more wireless gateway devices for assigning data paths, or transmitting data, receiving data and routing received data, or
one or more wireless intermediate devices or
one or more wireless gateway devices,
wherein at least one source-destination pair includes links between the one or more wireless end devices, and the one or more wireless intermediate devices and/or the one or more wireless gateway devices,
the communication path optimization system comprising:
a memory that stores
a set of routing rules specifying a maximum allowable end-to-end delay for a selected source-destination pair;
a processor coupled to the memory; and
an end-to-end delay minimization module executable by the processor and operable to transmit assigned acceptable paths resulting from execution of the end-to-end delay minimization module to a routing table for instructing at least one of the one or more wireless gateway devices and/or the wireless intermediate devices, the end-to-end delay minimization module including:
a path determination sub-module for determination of possible paths between the selected source-destination pair;
an end-to-end delay calculation sub-module for calculation of an end-to-end delay for one of the possible paths;
a path identification sub-module for identification of an acceptable path by comparing the calculated end-to-end delay for the one of the possible paths with the maximum allowable end-to-end delay, wherein a path is deemed acceptable if the calculated end-to-end delay is equal to or less than the maximum allowable end-to-end delay; and
a path assignment sub-module for assignment of the acceptable path to the routing table,
wherein the end-to-end delay calculation sub-module, the path identification sub-module and the path assignment sub-module are executed for each of the possible paths identified in the path determination sub-module.

48. The communication path optimization system of claim 47, wherein the processor that executes the end-to-end delay minimization module resides in a wireless gateway device.

49. The communication path optimization of claim 48, in which the wireless process control and/or automation network includes a plurality of wireless gateway devices, wherein the wireless gateway device that executes the end-to-end delay minimization module is a master wireless gateway device.

50. The communication path optimization system of claim 47, wherein the processor that executes the end-to-end delay minimization module resides in a computing device separate from a wireless gateway device.

51. A communication path optimization system for controlling a wireless process control and/or automation network, the wireless process control and/or automation network including
a tier of one or more wireless end devices for transmitting data and/or receiving data, and either
a tier of one or more wireless intermediate devices for transmitting data and/or receiving data and routing received data, and a tier of one or more wireless gateway devices for assigning data paths, transmitting data, receiving data and routing received data, or
a tier of one or more wireless intermediate devices or
a tier of one or more wireless gateway devices,
wherein at least one source-destination pair includes links between the one or more wireless end devices, and the one or more wireless intermediate devices and/or the one or more wireless gateway devices,
the communication path optimization system comprising:
a memory that stores
a set of routing rules specifying a maximum allowable tier delay for a selected source-destination pair;
a processor coupled to the memory; and
a tier delay minimization module executable by the processor and operable to transmit assigned acceptable paths resulting from execution of the tier delay minimization module to a routing table for instructing at least one of the one or more wireless gateway devices and/or the wireless intermediate devices, the tier delay minimization module including:
a path determination sub-module for determination of possible paths between the selected source-destination pair;
an tier delay calculation sub-module for calculation of an end-to-end delay for one of the possible paths;
a link identification sub-module for identification of an acceptable link or set of links by comparison of the calculated tier delay for that link or set of links with the maximum allowable tier delay for that one of the tiers, wherein a link or set of links is deemed acceptable if the calculated tier delay is equal to or less than the maximum allowable tier delay for that one of the tiers; and
a path assignment sub-module for assignment of an acceptable path to the routing table,
wherein the tier delay calculation sub-module and the link identification sub-module are executed for each tier of the one of the possible paths, and
wherein the tier delay calculation sub-module, the link identification sub-module and the path assignment sub-module are executed for each of the possible paths identified in the path determination sub-module.

52. The communication path optimization system of claim 51, wherein the processor that executes the tier delay minimization module resides in a wireless gateway device.

53. The communication path optimization system of claim 52, in which the wireless process control and/or automation network includes a plurality of wireless gateway devices, wherein the wireless gateway device that executes the tier delay minimization module is a master wireless gateway device.

54. The communication path optimization system of claim 51, wherein the processor that executes the tier delay minimization module resides in a computing device separate from a wireless gateway device.

55. A communication path optimization system for controlling a wireless process control and/or automation network, the wireless process control and/or automation network including
  a tier of one or more wireless end devices for transmitting data and/or receiving data, and either
    a tier of one or more wireless intermediate devices for transmitting data and/or receiving data and routing received data and a tier of one or more wireless gateway devices for assigning data paths, transmitting data, receiving data and routing received data, or
    a tier of one or more wireless intermediate devices or
    a tier of one or more wireless gateway devices,
  wherein at least one source-destination pair includes links between the one or more wireless end devices, and the one or more wireless intermediate devices and/or the one or more wireless gateway devices,
the communication path optimization system comprising:
  a memory that stores
    a set of routing rules specifying a maximum allowable tier delay and a maximum allowable end-to-end delay for a selected source-destination pair;
  a processor coupled to the memory; and
  a path determination module for determination of possible paths between the selected source-destination pair;
  an end-to-end delay minimization module executable by the processor and operable to identify potential acceptable paths resulting from execution of the end-to-end delay minimization module, the end-to-end delay minimization module including:
    an end-to-end delay calculation sub-module for calculation of an end-to-end delay for one of the possible paths;
    a path identification sub-module for identification of a potentially acceptable path by comparing the calculated end-to-end delay for the one of the possible paths with the maximum allowable end-to-end delay, wherein a path is deemed potentially acceptable if the calculated end-to-end delay is equal to or less than the maximum allowable end-to-end delay; and
  a tier delay minimization module executable by the processor and operable to transmit assigned acceptable paths resulting from execution of the tier delay minimization module to a routing table for instructing at least one of the one or more wireless gateway devices and/or the wireless intermediate devices, the tier delay minimization module including:
    an tier delay calculation sub-module for calculation of an end-to-end delay for one of the potentially acceptable paths;
    a link identification sub-module for identification of an acceptable link or set of links by comparison of the calculated tier delay for that link or set of links with the maximum allowable tier delay for that one of the tiers, wherein a link or set of links is deemed acceptable if the calculated tier delay is equal to or less than the maximum allowable tier delay for that one of the tiers; and
    a path assignment sub-module for assignment of an acceptable path to the routing table,
    wherein the tier delay calculation sub-module and the link identification sub-module are executed for each tier of the potentially acceptable paths, and
  wherein the end-to-end delay minimization module and tier delay minimization module are executed for each of the possible paths identified in the path determination module.

56. The communication path optimization system of claim 55, wherein the processor that executes the end-to-end delay minimization module and the tier delay minimization module resides in a wireless gateway device.

57. The communication path optimization system of claim 56, in which the wireless process control and/or automation network includes a plurality of wireless gateway devices, wherein the wireless gateway device that executes the end-to-end delay minimization module and the tier delay minimization module is a master wireless gateway device.

58. A communication path optimization system for controlling a wireless process control and/or automation network, the wireless process control and/or automation network including
  a tier of one or more wireless end devices for transmitting data and/or receiving data, and either
    a tier of one or more wireless intermediate devices for transmitting data and/or receiving data and routing received data, and a tier of one or more wireless gateway devices for assigning data paths, transmitting data, receiving data and routing received data, or
    a tier of one or more wireless intermediate devices or
    a tier of one or more wireless gateway devices,
  wherein at least one source-destination pair includes links between the one or more wireless end devices, and the one or more wireless intermediate devices and/or the one or more wireless gateway devices, the communication path optimization system comprising:
  a memory that stores
    a set of routing rules specifying a minimum reliability requirement for a selected source-destination pair,
    a specified minimum number of paths between the selected source-destination pair,
    a set of routing rules specifying a maximum allowable tier delay and a maximum allowable end-to-end delay for a selected source-destination pair, and
    a routing table containing instructions to be processed by at least one of the one or more wireless gateway devices and/or the wireless intermediate devices;
  a processor coupled to the memory;
  a path determination module for determination of possible paths between the selected source-destination pair;
  a route optimization module executable by the processor and operable to identify reliable paths between the selected source-destination pair;
  an end-to-end delay minimization module executable by the processor and operable to identify potential acceptable paths that have a calculated end-to-end delay which is equal to or less than a maximum allowable end-to-end delay; and
  a tier delay minimization module executable by the processor and operable to identify potential acceptable links or sets of links by comparison of a calculated tier delay for a selected link or set of links with a maximum allowable tier delay for a selected tier;
  wherein the potentially acceptable path for the selected source-destination pair is assigned to the routing table stored in the memory if all of the links or sets of links within the one of the possible paths are identified by the tier delay minimization module as acceptable, and if the potentially acceptable path is identified as reliable by the route optimization module, and wherein the end-to-end delay minimization module and tier delay minimization module are executed for each of the possible paths identified in the path determination module.

59. The communication path optimization system of claim 58, wherein the processor that executes the route optimization module, the end-to-end delay minimization module and the tier delay minimization module resides in a wireless gateway device.

60. The communication path optimization system of claim 59, in which the wireless process control and/or automation network includes a plurality of wireless gateway devices, wherein the wireless gateway device that executes the route optimization module, the end-to-end delay minimization module and the tier delay minimization module is a master wireless gateway device.

61. The communication path optimization system of claim 58, wherein the processor that executes the route optimization module, the end-to-end delay minimization module and the tier delay minimization module resides in a computing device separate from a wireless gateway device.

62. The communication path optimization system of claim 58, wherein the processor that executes the end-to-end delay minimization module and the tier delay minimization module resides in a computing device separate from a wireless gateway device.

* * * * *

UNITED STATES PATENT AND TRADEMARK OFFICE
CERTIFICATE OF CORRECTION

PATENT NO.         : 8,396,012 B2
APPLICATION NO.    : 12/990588
DATED              : March 12, 2013
INVENTOR(S)        : Daraiseh et al.

Page 1 of 1

It is certified that error appears in the above-identified patent and that said Letters Patent is hereby corrected as shown below:

In the Claims:

For col. 31, l. 26, correct "tier delay" to "end-to-end delay"
For col. 34, l. 43, correct "an tier" to "a tier"
For col. 34, l. 44, correct "an end-to-end delay" to "a tier delay"
For col. 35, l. 57, correct "an tier" to "a tier"
For col. 35, l. 58, correct "an end-to-end delay" to "a tier delay"

Signed and Sealed this
Tenth Day of September, 2013

Teresa Stanek Rea
*Acting Director of the United States Patent and Trademark Office*